(12) United States Patent
Osaka et al.

(10) Patent No.: US 11,667,055 B2
(45) Date of Patent: Jun. 6, 2023

(54) METHOD AND APPARATUS FOR PRODUCING PARTICLES, PARTICLES, COMPOSITION, PARTICLES DISPERSION LIQUID, AND METHOD FOR PRODUCING THE PARTICLES DISPERSION LIQUID

(71) Applicant: Ricoh Company, Ltd., Tokyo (JP)

(72) Inventors: Keiko Osaka, Kanagawa (JP); Chiaki Tanaka, Shizuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 24 days.

(21) Appl. No.: 16/970,258

(22) PCT Filed: Feb. 13, 2019

(86) PCT No.: PCT/JP2019/005168
§ 371 (c)(1),
(2) Date: Aug. 14, 2020

(87) PCT Pub. No.: WO2019/159988
PCT Pub. Date: Aug. 22, 2019

(65) Prior Publication Data
US 2021/0138688 A1    May 13, 2021

(30) Foreign Application Priority Data

Feb. 14, 2018  (JP) .............................. JP2018-024333
Feb. 6, 2019   (JP) .............................. JP2019-019261

(51) Int. Cl.
*B29B 9/10*     (2006.01)
*B29B 17/04*    (2006.01)
(Continued)

(52) U.S. Cl.
CPC ............ *B29B 9/10* (2013.01); *B29B 17/0412* (2013.01); *C08J 3/12* (2013.01); *C08J 11/24* (2013.01);
(Continued)

(58) Field of Classification Search
CPC .......... B29B 17/0412; B29B 2009/125; B29B 2017/0428; B29B 9/10; B29B 9/16;
(Continued)

(56) References Cited

U.S. PATENT DOCUMENTS

| | | | | |
|---|---|---|---|---|
| 4,605,762 A | * | 8/1986 | Mandoki ................ | C07C 51/09 562/593 |
| 5,136,057 A | * | 8/1992 | Bhatia .................. | C07D 319/12 562/580 |

(Continued)

FOREIGN PATENT DOCUMENTS

| | | |
|---|---|---|
| JP | 2010-156824 A | 7/2010 |
| JP | 2013-198880 A | 10/2013 |

(Continued)

OTHER PUBLICATIONS

Fakirov, "Handbook of Thermoplastic Polyesters: Homopolymers, Copolymers, Blends, and Composites", Apr. 2002, pp. 1235-1239 (Year: 2002).*

(Continued)

*Primary Examiner* — Frances Tischler
(74) *Attorney, Agent, or Firm* — Xsensus LLP

(57) ABSTRACT

A method for producing particles, the method including: depolymerizing a resin to obtain a depolymerized product; contacting the depolymerized product obtained in the depolymerizing with a first compressive fluid to obtain a melted product; and jetting the melted product obtained in the contacting to granulate the particles.

8 Claims, 8 Drawing Sheets

(51) Int. Cl.
*C08J 3/12* (2006.01)
*C08J 11/24* (2006.01)

(52) U.S. Cl.
CPC ... *B29B 2017/0428* (2013.01); *C08J 2367/02* (2013.01); *C08J 2367/04* (2013.01)

(58) Field of Classification Search
CPC ........ C08J 11/14; C08J 11/24; C08J 2300/16; C08J 2367/02; C08J 2367/04; C08J 3/12; C08J 3/18; Y02W 30/62
See application file for complete search history.

(56) References Cited

U.S. PATENT DOCUMENTS

| | | | |
|---|---|---|---|
| 8,802,814 | B2 | 8/2014 | Le et al. |
| 8,877,420 | B2 | 11/2014 | Tanaka et al. |
| 9,469,723 | B2 | 10/2016 | Osaka et al. |
| 2011/0218301 | A1 | 9/2011 | Nemoto et al. |
| 2013/0337025 | A1* | 12/2013 | Le .................. C08G 63/91 424/501 |
| 2015/0043943 | A1 | 2/2015 | Osaka et al. |
| 2015/0252141 | A1 | 9/2015 | Osaka et al. |
| 2015/0267039 | A1 | 9/2015 | Osaka et al. |
| 2015/0376363 | A1 | 12/2015 | Watanabe et al. |
| 2016/0083512 | A1 | 3/2016 | Kamada et al. |

FOREIGN PATENT DOCUMENTS

| | | |
|---|---|---|
| JP | 2013-216847 | 10/2013 |
| JP | 2014-077051 | 5/2014 |
| JP | 2014-097440 A | 5/2014 |
| WO | WO2013/137365 A1 | 9/2013 |
| WO | WO2013/146558 A1 | 10/2013 |
| WO | WO2014/057869 A1 | 4/2014 |
| WO | WO2014/077206 A1 | 5/2014 |

OTHER PUBLICATIONS

Bigg, "Polylactide Copolymers: Effect of Copolymer Ratio and End Capping on their Properties", Advances in Polymer Technology, vol. 24, No. 2, 69-82 (2005) (Year: 2005).*

International Search Report dated May 27, 2019 for counterpart International Patent Application No. PCT/JP2019/005168 filed Feb. 13, 2019.

Written Opinion dated May 27, 2019 for counterpart International Patent Application No. PCT/JP2019/005168 filed Feb. 13, 2019.

Office Action dated Nov. 22, 2022, in corresponding Japanese patent Application No. 2019-019261, 12 pages.

* cited by examiner

[Fig. 1]
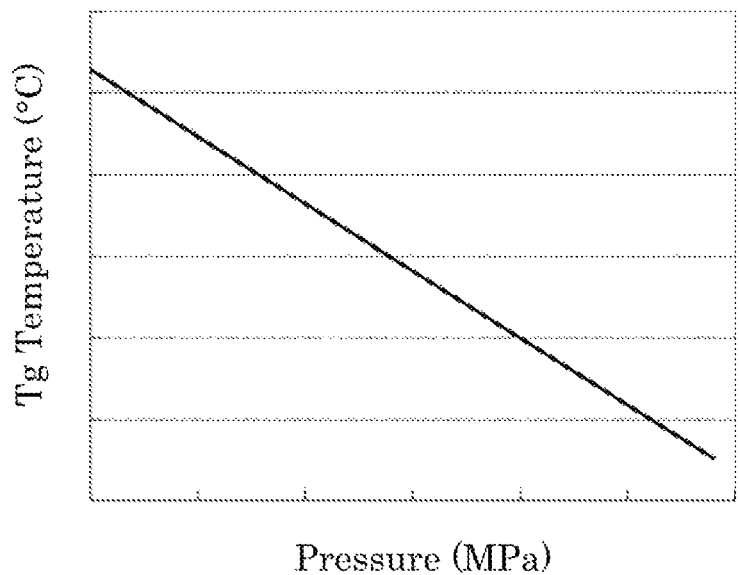
[Fig. 2]
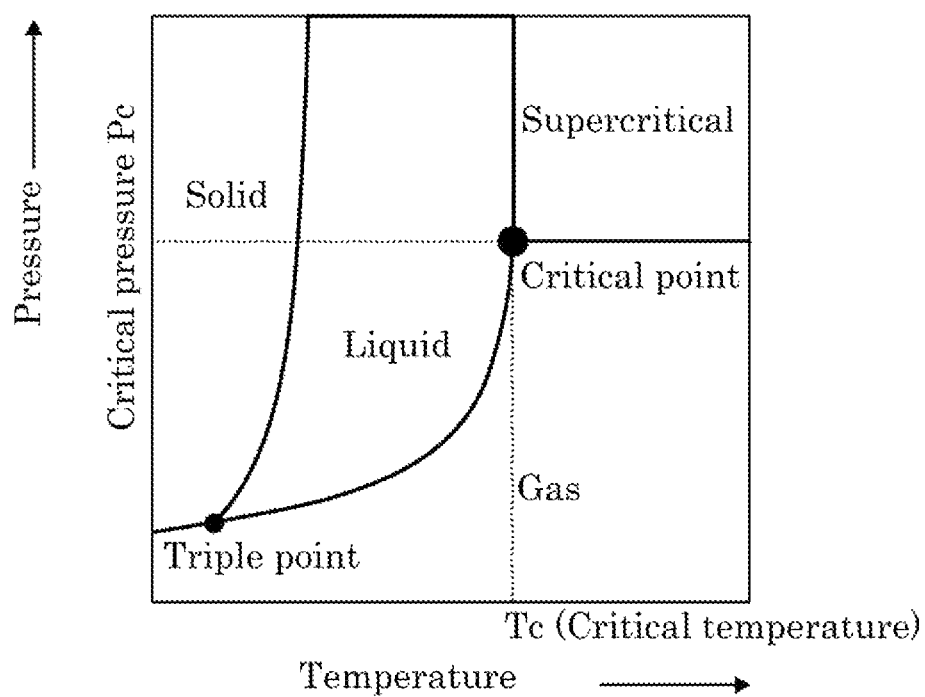

[Fig. 3]
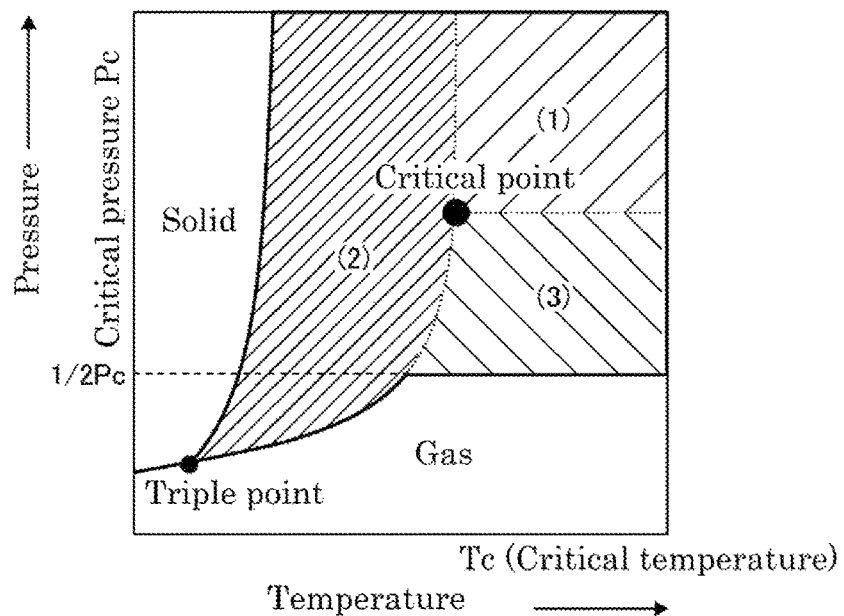
[Fig. 4]
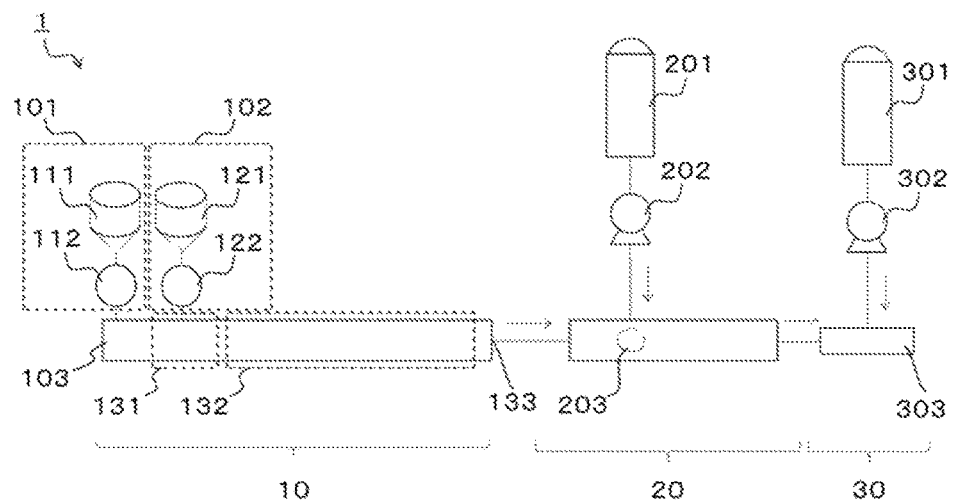
[Fig. 5]
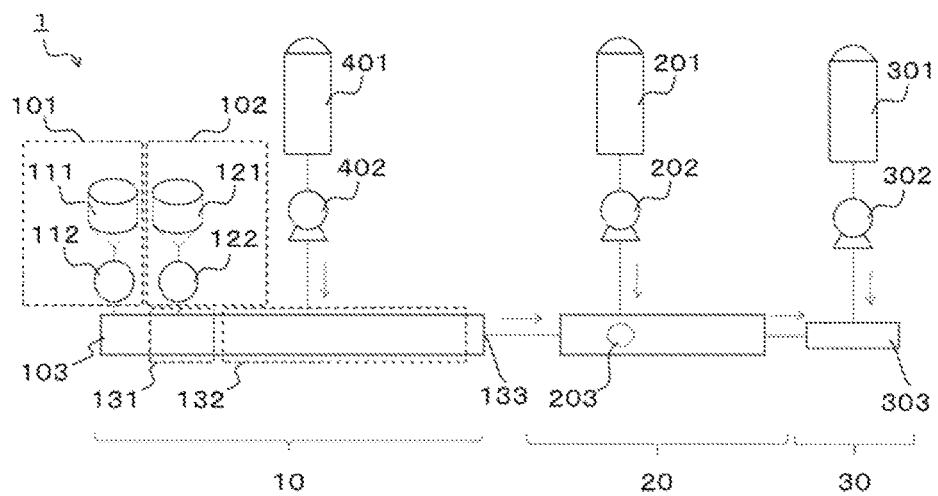

[Fig. 6]
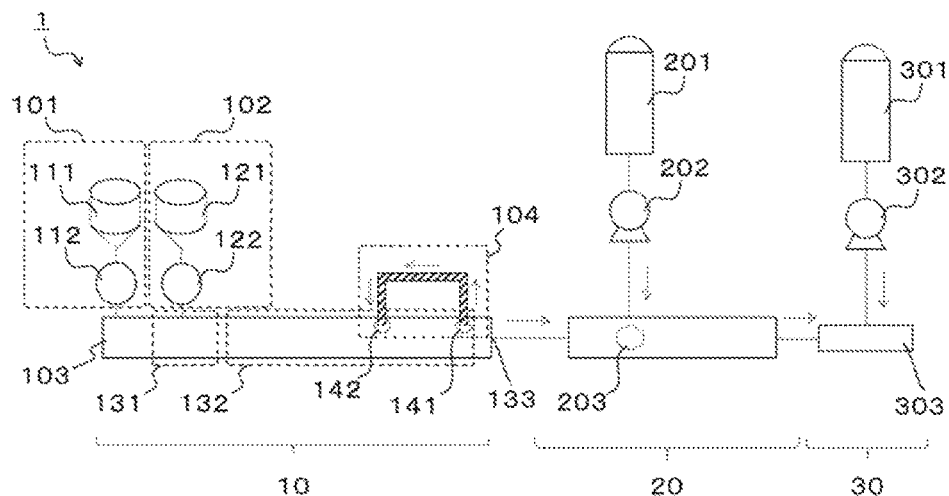
[Fig. 7]
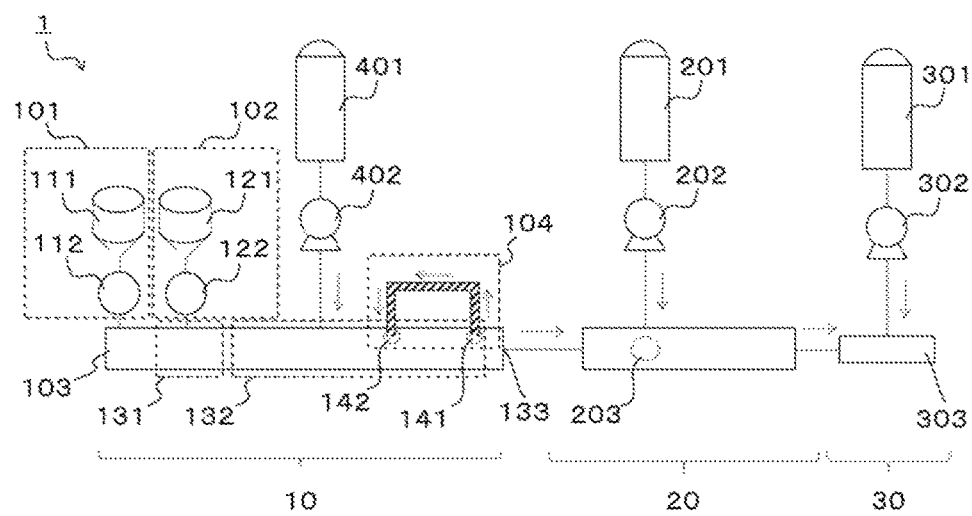
[Fig. 8]
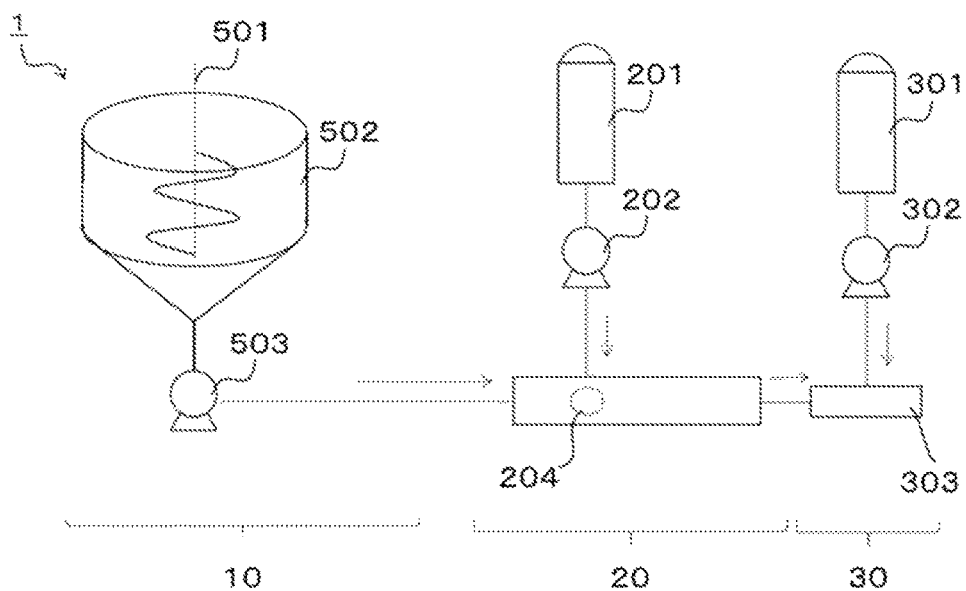

[Fig. 9]
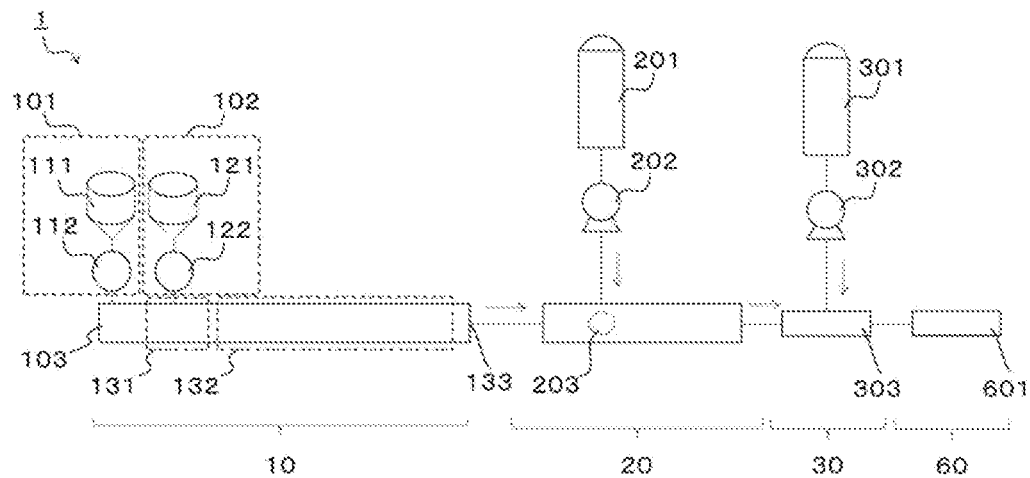
[Fig. 10]
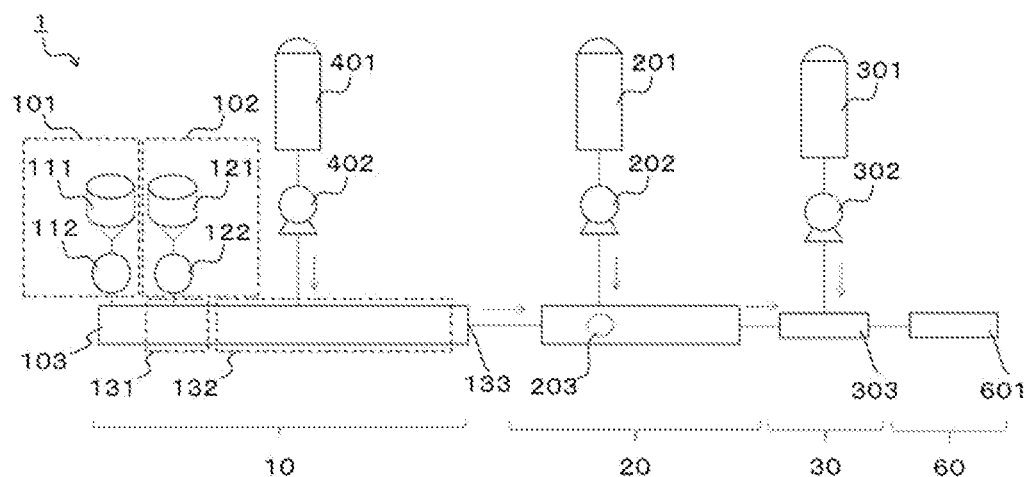
[Fig. 11]
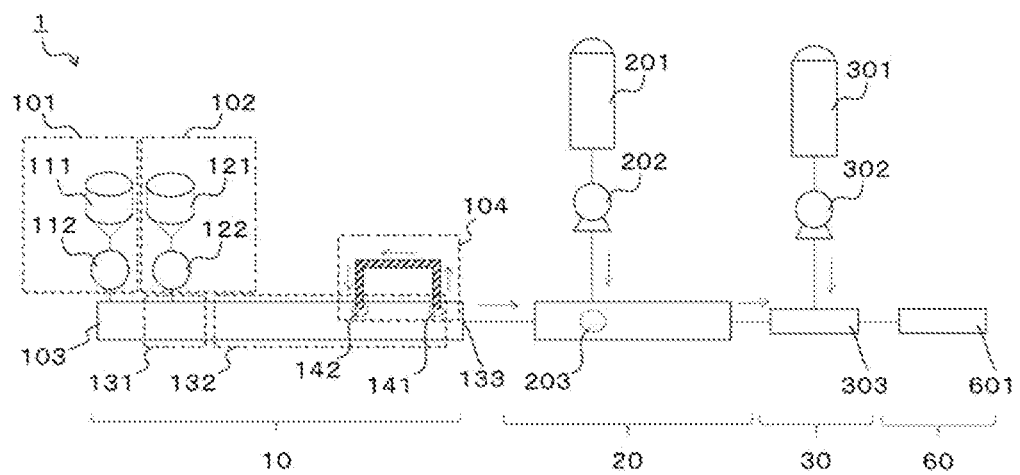

[Fig. 12]
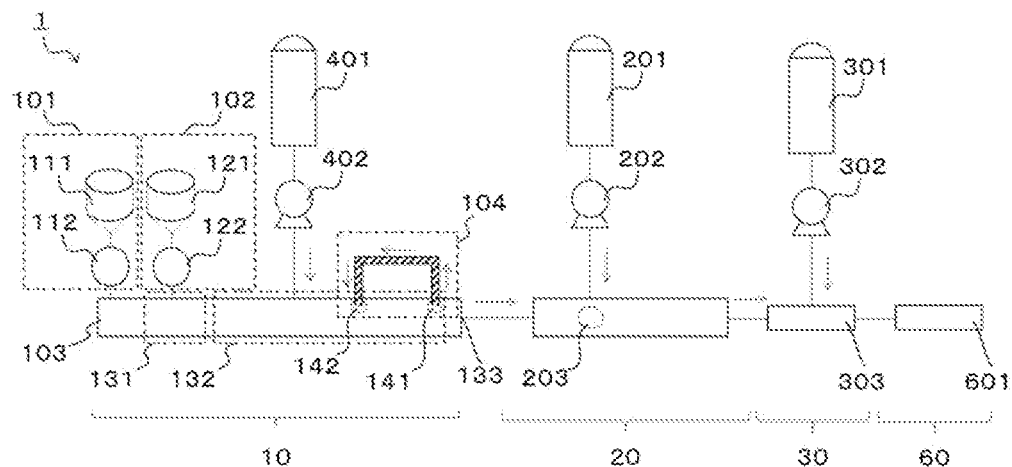
[Fig. 13]
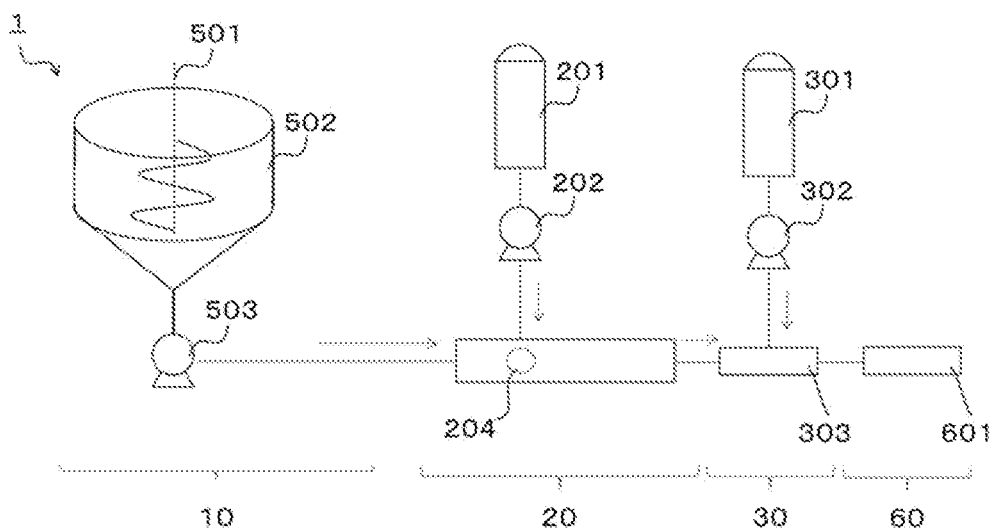

[Fig. 14]
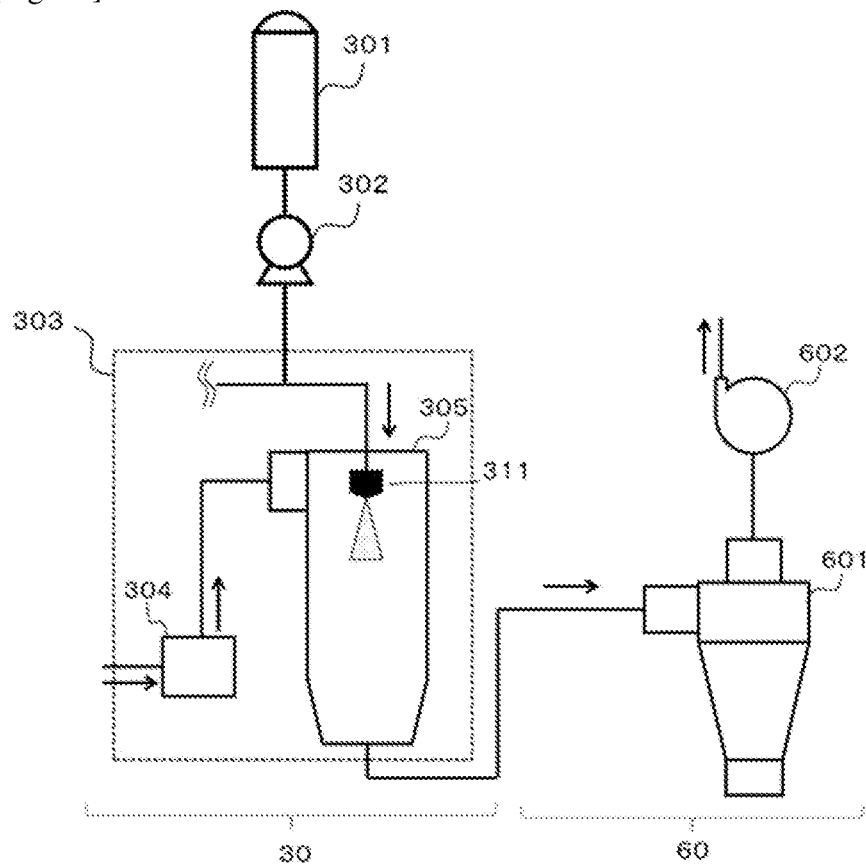
[Fig. 15]
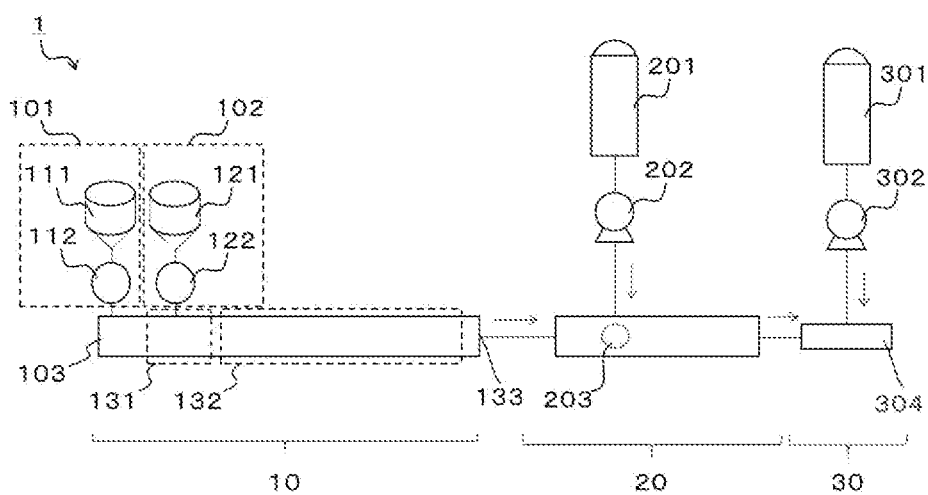

[Fig. 16]
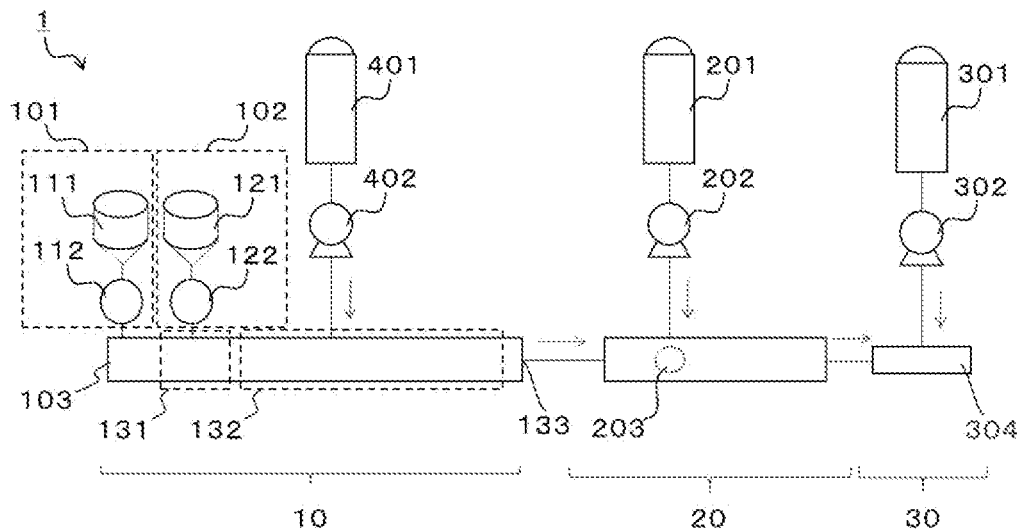
[Fig. 17]
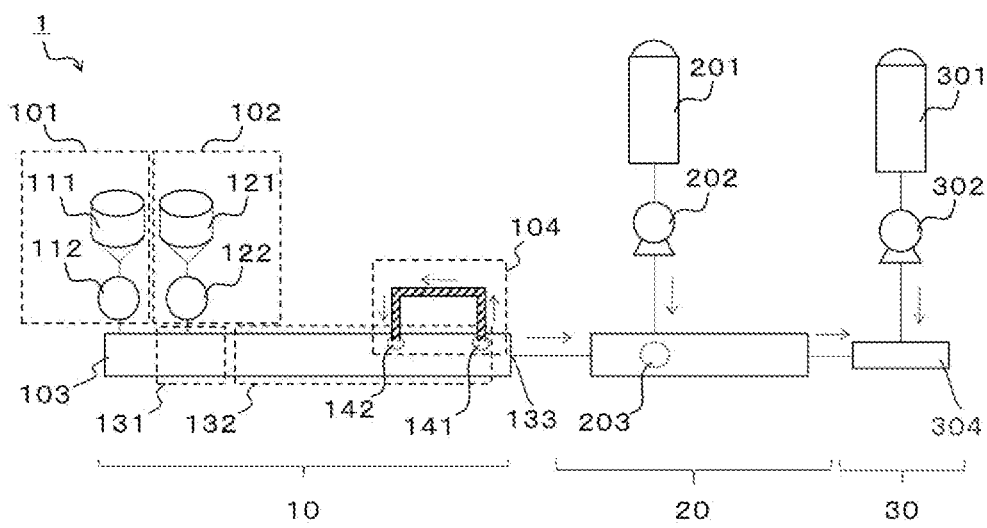
[Fig. 18]
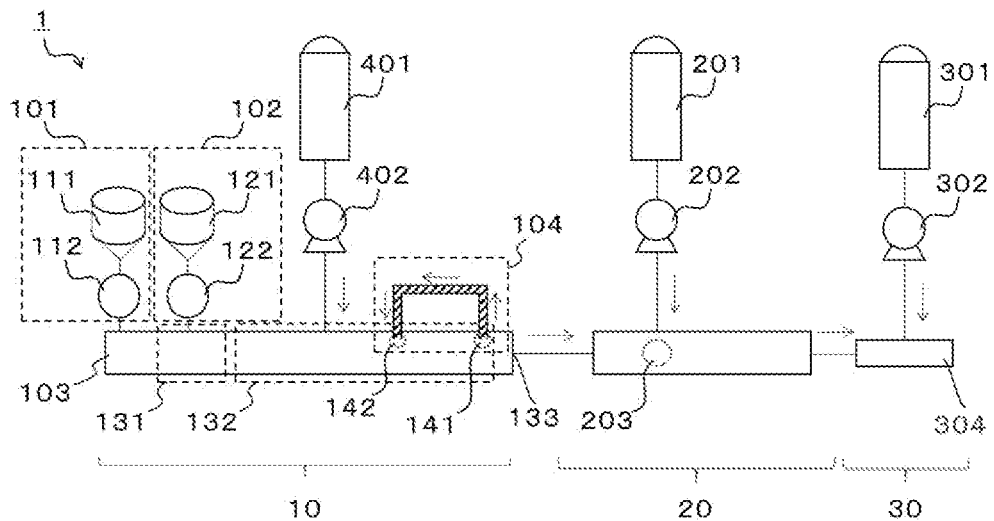

[Fig. 19]
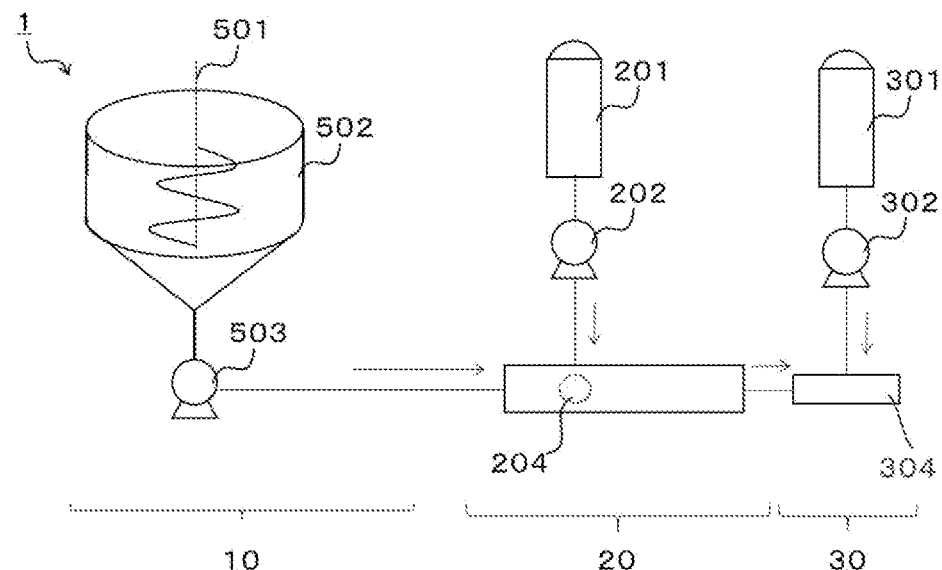
[Fig. 20]
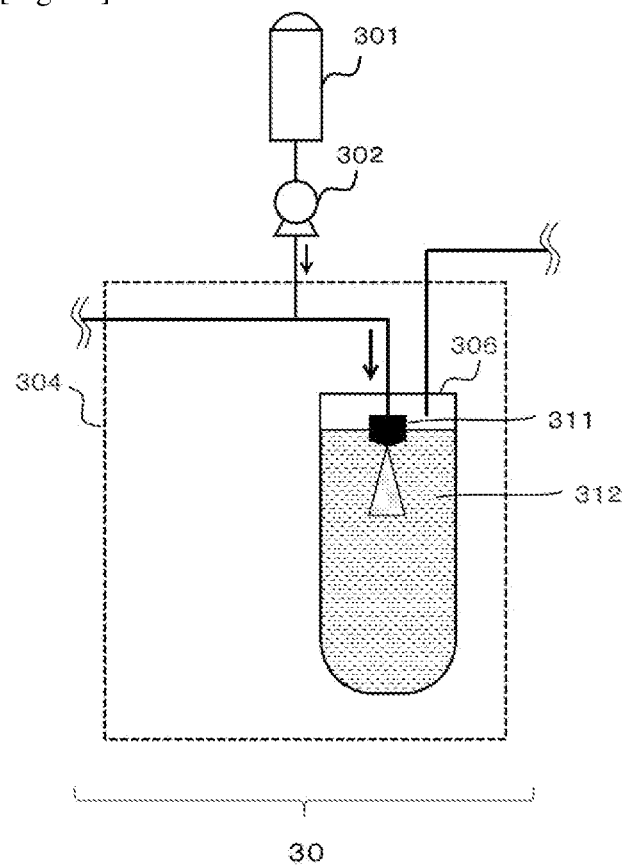

METHOD AND APPARATUS FOR PRODUCING PARTICLES, PARTICLES, COMPOSITION, PARTICLES DISPERSION LIQUID, AND METHOD FOR PRODUCING THE PARTICLES DISPERSION LIQUID

TECHNICAL FIELD

The present disclosure relates to a method for producing particles, an apparatus for producing particles, particles, a composition, a particles dispersion liquid, and a method for producing the particles dispersion liquid.

BACKGROUND ART

Conventionally, there has been known a method for producing particles by contacting a compressive fluid with a pressure plastic material to promote plasticization of the pressure plastic material and then jetting the melted product obtained to granulate the particles.

For example, there has been known a method including a step of contacting a ring-opening polymerizable monomer with a compressive fluid without heating the resin to a high temperature and then allowing ring-opening polymerization of the ring-opening polymerizable monomer (see, for example, PTL 1).

CITATION LIST

Patent Literature

[PTL 1] Japanese Unexamined Patent Application Publication No. 2013-216847

SUMMARY OF INVENTION

Technical Problem

The present disclosure has an object to provide a method for producing particles, which can stably produce particles having an appropriate molecular weight enough for achieving biodegradability.

Solution to Problem

A method of the present disclosure for producing particles as a means for achieving the above object includes: depolymerizing a resin to obtain a depolymerized product; contacting the depolymerized product obtained in the depolymerizing with a first compressive fluid to obtain a melted product; and jetting the melted product obtained in the contacting to granulate the particles.

Advantageous Effects of Invention

According to the present disclosure, it is possible to provide a method for producing particles, which can stably produce particles having an appropriate molecular weight enough for achieving biodegradability.

BRIEF DESCRIPTION OF DRAWINGS

FIG. 1 is a diagram presenting a relationship between a glass transition temperature of a resin and pressure.

FIG. 2 is a phase diagram presenting a state of a substance with respect to temperature and pressure.

FIG. 3 is a phase diagram for defining a range of a compressive fluid.

FIG. 4 is a diagram presenting one example of an apparatus of the present disclosure for producing particles.

FIG. 5 is a diagram presenting another example of an apparatus of the present disclosure for producing particles.

FIG. 6 is a diagram presenting another example of an apparatus of the present disclosure for producing particles.

FIG. 7 is a diagram presenting another example of an apparatus of the present disclosure for producing particles.

FIG. 8 is a diagram presenting another example of an apparatus of the present disclosure for producing particles.

FIG. 9 is a diagram presenting another example of an apparatus of the present disclosure for producing particles.

FIG. 10 is a diagram presenting another example of an apparatus of the present disclosure for producing particles.

FIG. 11 is a diagram presenting another example of an apparatus of the present disclosure for producing particles.

FIG. 12 is a diagram presenting another example of an apparatus of the present disclosure for producing particles.

FIG. 13 is a diagram presenting another example of an apparatus of the present disclosure for producing particles.

FIG. 14 is a diagram presenting one example of a collection unit of an apparatus of the present disclosure for producing particles.

FIG. 15 is a diagram presenting one example of an apparatus of the present disclosure for producing a particles dispersion liquid.

FIG. 16 is a diagram presenting another example of an apparatus of the present disclosure for producing a particles dispersion liquid.

FIG. 17 is a diagram presenting another example of an apparatus of the present disclosure for producing a particles dispersion liquid.

FIG. 18 is a diagram presenting another example of an apparatus of the present disclosure for producing a particles dispersion liquid.

FIG. 19 is a diagram presenting another example of an apparatus of the present disclosure for producing a particles dispersion liquid.

FIG. 20 is a diagram presenting one example of a jetting part of an apparatus of the present disclosure for producing a particles dispersion liquid.

DESCRIPTION OF EMBODIMENTS (Method for Producing Particles and Apparatus for Producing Particles)

A method of the present disclosure for producing particles includes: depolymerizing a resin to obtain a depolymerized product; contacting the depolymerized product obtained in the depolymerizing with a first compressive fluid to obtain a melted product; and jetting the melted product obtained in the contacting to granulate the particles, and further includes other steps if necessary.

An apparatus of the present disclosure for producing particles includes: a depolymerizing unit configured to depolymerize a resin to obtain a depolymerized product; a melting unit configured to contact the depolymerized product obtained in the depolymerizing unit with a first compressive fluid to obtain a melted product; and a granulation unit configured to jet the melted product obtained in the melting unit to granulate the particles, and further includes other units if necessary.

The method for producing particles can be suitably performed by the apparatus for producing particles.

The method of the present disclosure for producing particles is based on the finding that the conventional methods for producing particles cause the following problems. Specifically, in the conventional methods for producing particles, when a resin has a large molecular weight or crystallinity, affinity between the resin and a compressive fluid is lowered, which makes it difficult to mix the resin and the compressive fluid. As a result, it is necessary to mix the resin with the compressive fluid after the resin is heated to a high temperature so as to have a low viscosity. Therefore, the obtained particles are colored due to the influence of heat.

According to the conventional technique described in the above PTL 1, in a step of contacting a ring-opening polymerizable monomer with a compressive fluid and allowing the ring-opening polymerization of the ring-opening polymerizable monomer, such a condition that a polymer is mixed with the compressive fluid can be achieved (a state that the polymer and the compressive fluid are mixed is achieved). In this case, compared to the case where the polymer is heated to a high temperature so as to have a low viscosity and is mixed with a compressive fluid, the quantity of heat to be added to the polymer can be small, but the technique cannot be applied to polymers obtained through polymerization methods excluding the ring-opening polymerization method, which is problematic. For example, it cannot be applied to the obtained polymer that has undergone dehydration polycondensation reaction (e.g., polybutylene succinate). In the method of the present disclosure for producing particles, the viscosity of the melted resin can be lowered without heating it to a high temperature by depolymerizing the resin so as to have an appropriate molecular weight. As a result, the resin is easily mixed with the compressive fluid to facilitate plasticization of the resin, which makes it possible to stably produce the particles.

<Depolymerization Step and Depolymerizing Unit>

The depolymerization step is a step of depolymerizing a resin to obtain a depolymerized product.

The depolymerizing unit is a unit configured to depolymerize a resin to obtain a depolymerized product.

The depolymerization step is a step of depolymerizing a resin. By depolymerizing the resin, it is possible to obtain a depolymerized product having a predetermined molecular weight. A method for performing the depolymerization is not particularly limited and may be appropriately selected depending on the intended purpose. Examples thereof include a method by hydrolyzing a resin in the presence of a depolymerizing agent and an acid catalyst in the case where the resin is a polyester resin.

In the depolymerization step, the resin is preferably allowed to flow with the resin being depolymerized, in a presence of the depolymerizing agent.

—Resin—

The resin is preferably a resin containing a carbonyl —C(=O)— structure.

The resin containing a carbonyl —C(=O)— structure has excellent affinity with the compressive fluid, and exhibits a high plasticizing effect. Although the specific principle has not been known yet, the following reason is considered. In the carbonyl —C(=O)— structure, oxygen having high electronegativity is bonded to carbon through the π-bond, and the π-bond electron is strongly attracted to the oxygen. Therefore, the oxygen is negatively polarized and the carbon is positively polarized, which leads to high reactivity. In the case where the compressive fluid is carbon dioxide, it is believed that both the resin and the carbon dioxide have high affinity because the carbonyl —C(=O)— structure is similar to the structure of the carbon dioxide.

The resin containing a carbonyl —C(=O)— structure is not particularly limited and may be appropriately selected depending on the intended purpose. Examples thereof include polyester resins, urethane resins, polyol resins, polyamide resins, rosin, modified rosin, and terpene resins. These may be used alone or in combination. Among them, a polyester resin is particularly preferable.

The polyester resin is not particularly limited and may be appropriately selected depending on the intended purpose. Examples thereof include modified polyester resins, unmodified polyester resins, noncrystalline polyester resins, crystalline polyester resins, polylactic acid resins, and polybutylene succinate resins. Among them, a polylactic acid resin and a polybutylene succinate resin are particularly preferable.

The polylactic acid resin is not particularly limited and may be appropriately selected depending on the intended purpose. Examples thereof include L-form, D-form, and racemic body polylactic acid resins, polylactic acid resins of stereo complex, and polylactic acid-based block copolymers.

Examples of the polyol resin include polyether polyol resins having an epoxy skeleton. Specific examples thereof include epoxy resins, alkylene oxide adducts of dihydric phenol or glycidyl ethers thereof, and polyol resins obtained by allowing a compound, which has active hydrogen that reacts with an epoxy group, to react.

In addition to the resin containing a carbonyl —C(=O)— structure, other resins can be used.

The other resins are not particularly limited and may be appropriately selected depending on the intended purpose. Examples thereof include vinyl resins, epoxy resins, phenol resins, aliphatic or alicyclic hydrocarbon resins, aromatic petroleum resins, chlorinated paraffin, paraffin wax, polyethylene, and polypropylene. These may be used alone or in combination.

The vinyl resin is not particularly limited and may be appropriately selected depending on the intended purpose. Examples thereof include styrene (e.g., polystyrene, poly p-chlorostyrene, and polyvinyltoluene) and polymers of substitutes thereof; styrene-based copolymers such as styrene-p-chlorostyrene copolymers, styrene-propylene copolymers, styrene-vinyltoluene copolymers, styrene-vinylnaphthalene copolymers, styrene-methyl acrylate copolymers, styrene-ethyl acrylate copolymers, styrene-butyl acrylate copolymers, styrene-octyl acrylate copolymers, styrene-methyl methacrylate copolymers, styrene-ethyl methacrylate copolymers, styrene-butyl methacrylate copolymers, styrene-α-methyl chloromethacrylate copolymers, styrene-acrylonitrile copolymers, styrene-vinyl methyl ketone copolymers, styrene-isoprene copolymers, styrene-acrylonitrile-indene copolymers, styrene-maleic acid copolymers, and styrene-maleate copolymers; and polymers of monomers such as polymethyl methacrylate, polybutylmethacrylate, polyvinyl chloride, polyvinyl acetate, vinyl propionate, (meth)acrylamide, vinyl methyl ether, vinyl ethyl ether, vinyl isobutyl ether, vinyl methyl ketone, N-vinylpyrrolidone, N-vinylpyrimidine, and butadiene; copolymers including two or more kinds of these monomers; and mixtures thereof.

—Depolymerizing Agent—

The depolymerizing agent is not particularly limited and may be appropriately selected depending on the intended purpose. Examples thereof include water, alcohols, and acid catalysts.

The alcohol is not particularly limited and may be appropriately selected depending on the intended purpose.

Examples thereof include methanol, ethanol, propanol, ethylene glycol, and 1,4-butanediol.

Among them, alcohol having a high boiling point is preferable because it can be used in an industrial step.

The acid catalyst is not particularly limited and may be appropriately selected depending on the intended purpose. For example, an acid catalyst having the same structure as that of the monomer of the resin is preferable.

An end-capping agent can be used in order to adjust a molecular weight.

The end-capping agent is not particularly limited and a conventional end-preventing agent can be used, so long as it can mainly prevent hydrolysis due to, for example, moisture in the air. Examples thereof include carbodiimide compounds, epoxy compounds, and oxazoline compounds. Among them, a compound having one or more carbodimide groups in a molecule thereof (including polycarbodiimide compounds) is preferable.

Examples of the compound having the carbodiimide group include monocarbodiimide compounds. Examples of the monocarbodiimide compounds include dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, and di-β-naphthylcarbodiimide.

The resin is a pressure plastic material having a property of lowering a glass transition temperature (Tg) through application of pressure. That is, the pressure plastic material means a material that can be plasticized through pressurization without application of heat.

A method for plasticizing the resin is, for example, a method by contacting the resin with a compressive fluid. When the resin contacts with the compressive fluid, pressure is applied to the resin, making it possible to plasticize the resin at a temperature lower than a glass transition temperature of the resin at atmospheric pressure.

FIG. 1 is a diagram presenting a relationship between the glass transition temperature (vertical axis) of polystyrene, as one example of a resin, and the pressure (horizontal axis) in the presence of carbon dioxide as one example of the compressive fluid. As depicted in FIG. 1, the glass transition temperature of polystyrene and the pressure are correlated, and the gradient thereof is negative. Similarly, other resins can also form a graph presenting a relationship between a glass transition temperature thereof and pressure. When the gradient is negative in the graph, such a resin can be referred to as a pressure plastic material.

The gradient is different depending on a type, formulation, and molecular weight of the resin. For example, when the resin is a polystyrene resin, the gradient is −9° C./MPa. When the resin is a styrene-acryl resin, the gradient is −9° C./MPa. When the resin is a noncrystalline polyester resin, the gradient is −8° C./MPa. When the resin is crystalline polyester, the gradient is −2° C./MPa. When the resin is a polyol resin, the gradient is −8° C./MPa. When the resin is a polyurethane resin, the gradient is −7° C./MPa. When the resin is a polyacrylate resin, the gradient is −11° C./MPa. When the pressure plastic resin is a polycarbonate resin, the gradient is −10° C./MPa.

The gradient can be determined based in the following manner. Specifically, a grass transition temperature thereof is measured with, for example, a high pressure calorimeter (available from SETARAM, C-80) with the pressures applied being changed, and the gradient is determined based on the results from the measurement. In this case, a sample is set in a high pressure measuring cell, and the cell is then purged with carbon dioxide. After that, pressure is applied to a predetermined pressure, and a glass transition temperature of the sample can be measured. Moreover, the gradient can be determined based on the variation of the glass transition temperature when the pressure is changed from atmospheric pressure (0.1 MPa) to 10 MPa.

The gradient of the change of the glass transition temperature relative to the pressure is not particularly limited and may be appropriately selected depending on the intended purpose. The gradient thereof is preferably −1° C./MPa or less, more preferably −5° C./MPa or less, and even more preferably −10° C./MPa or less. The lower limit of the gradient is not particularly limited. When the gradient is more than −1° C./MPa, plasticization is insufficient through application of pressure without application of heat. As a result, the melted product cannot have low viscosity, and therefore it may be difficult to granulate particles.

In the depolymerization step of the method of the present disclosure for producing particles, a first compressive fluid to be used in a melting step, which will be described hereinafter, can be supplied to the resin. By supplying the first compressive fluid to the resin, depolymerization reaction can be facilitated, which makes it possible to shorten the required time for the depolymerization step.

<Melting Step and Melting Unit>

The melting step is a step of contacting the depolymerized product obtained in the depolymerization step with a first compressive fluid to obtain a melted product.

The melting unit is a unit configured to contact the depolymerized product obtained in the depolymerization step with the first compressive fluid to obtain the melted product.

The melting means such a state that the depolymerized product contacts with the first compressive fluid to be plasticized and liquefied with swelling.

—First Compressive Fluid—

The first compressive fluid is not particularly limited and may be appropriately selected depending on the intended purpose, so long as it becomes liquid under such a condition that pressure is applied. Examples thereof include supercritical fluids, subcritical fluids, and liquid fluids.

—Supercritical Fluid and Subcritical Fluid—

The supercritical fluid means a fluid as described below. That is, the supercritical fluid has intermediate characteristics of gas and liquid and has characteristics such as rapid mass transfer or heat transfer and low viscosity. In addition, the supercritical fluid can continuously greatly change, for example, its density, dielectric constant, solubility parameter, and free volume by changing its temperature and pressure. Since the supercritical fluid has an extremely small surface tension compared to those of organic solvents, the supercritical fluid can follow a minute undulation (surface) to wet the surface with the supercritical fluid.

The supercritical fluid is not particularly limited and may be appropriately selected depending on the intended purpose, but it is preferably a supercritical fluid having a low critical temperature and a low critical pressure. Moreover, the subcritical fluid is not particularly limited and may be appropriately selected depending on the intended purpose, so long as it is present as a high pressure liquid or a high pressure gas in the temperature and pressure regions adjacent to the critical point.

Examples of the supercritical fluid or subcritical fluid include carbon monoxide, carbon dioxide, nitrogen monoxide, ammonia, nitrogen, methane, ethane, propane, n-butane, isobutane, n-pentane, isobutane, and chlorotrifluoromethane. Among them, carbon dioxide is preferable. The reason for this is because a critical pressure and a critical temperature thereof are 7.3 MPa and 31° C., respectively, and therefore carbon dioxide is easily turned into a supercritical state. Moreover, carbon dioxide is incombustible and is highly safe. In addition, carbon dioxide is easily collected and recycled as it is gasified only by returning back to the normal pressure. Furthermore, it is not necessary to dry the particles obtained, waste liquids are not generated, and the particles obtained contain no residual monomer. These may be used alone or in combination.

—Liquid Fluid—

The liquid fluid is not particularly limited and may be appropriately selected depending on the intended purpose. Examples thereof include liquid carbon dioxide, liquid methane, liquid ethane, liquid propane, and liquid butane. These may be used alone. Alternatively, two or more liquid fluids may be used in combination to be used as a mixture. Among them, liquid carbon dioxide is preferable because it is incombustible and is highly safe.

Because the first compressive fluid used in the depolymerization step and the melting step, carbon dioxide is preferably used because of the following reasons. That is, carbon dioxide can be easily turned into a supercritical state and is incombustible and highly safe. Moreover, it has good affinity to the carbonyl structure.

The first compressive fluid may be used together with an entrainer (co-solvent).

Examples of the entrainer include: alcohols such as methanol, ethanol, and propanol; ketones such as acetone and methyl ketone; and organic solvents such as toluene, ethyl acetate, and tetrahydrofurane.

Because the first compressive fluid is easily separated from a target product, it is possible to realize a breakthrough method for producing particles, which does not need water or an organic solvent being conventionally used and is low in the environmental load.

The compressive fluid used in the method of the present disclosure for producing particles will be described with reference to FIGS. 2 and 3.

FIG. 2 is a phase diagram presenting a state of a substance with respect to temperature and pressure. FIG. 3 is a phase diagram which defines a range of a compressive fluid. The compressive fluid has characteristics such as rapid mass transfer or heat transfer and low viscosity. In addition, the compressive fluid also has characteristics of continuously greatly changing, for example, its density, dielectric constant, solubility parameter, and free volume by changing the temperature and pressure. Since the compressive fluid has an extremely small surface tension compared to those of organic solvents, the compressive fluid can follow a minute undulation (surface) to wet the surface with the compressive fluid. Moreover, the compressive fluid can be easily separated from a product by returning the pressure to the normal pressure, and is possible to be collected or reused. Therefore, the method for producing particles can reduce environmental load due to the production, compared to the methods for producing particles using water or an organic solvent.

The compressive fluid refers to a state of a substance, which is present in any one of the regions (1), (2), and (3) of FIG. 3 in the phase diagram of FIG. 2. In such regions, it is known that the substance exhibits extremely high density and exhibits different behaviors from those exhibited at normal temperature and normal pressure. Note that, the substance present in the region (1) is a supercritical fluid. The supercritical fluid is a fluid as described below. Specifically, the supercritical fluid exists as a noncondensable high-density fluid at temperature and pressure exceeding the limit (critical point) at which gas and liquid can coexist. In addition, the supercritical fluid is not condensed even when compressed, and is in the state of the critical temperature or higher and the critical pressure (Pc) or higher. Moreover, the substance present in the region (2) is liquid, and means liquid gas obtained by compressing a substance existing as gas at normal temperature (25° C.) and normal pressure (1 atm). Further, the substance present in the region (3) is gas. However, in the present embodiment, it is a high-pressure gas whose pressure is ½ Pc or higher.

Here, the melting step in the method of the present disclosure for producing particles will be described in detail.

Conventionally, a method for precipitating a substance in the supercritical fluid through the pressure reduction step is known as a rapid expansion of supercritical solutions (RESS) method.

A target to be discharged used in the method known as the RESS method is one obtained by dissolving a material to be a solute in the compressive fluid. The compressive fluid and the material to be a solute are compatible in a homogeneous state.

Meanwhile, in the melting step of the present disclosure, the particles from gas saturated solutions (PGSS) method is used.

The melted product that is a target to be discharged in the PGSS method is one obtained by contacting the compressive fluid with the resin to be swelled and lowering viscosity of the resin, as described above. As a result, there exists an interface between the compressive fluid and the melted product.

That is, the target to be discharged in the RESS method is in a phase of the compressive fluid-solid equilibrium state, while the target to be discharged in the PGSS is in a phase of the compressive fluid-liquid equilibrium state. Therefore, even when these methods are a method using the same compressive fluid, both phase states of targets to be discharged before the discharge are different.

<Granulation Step and Granulation Unit>

The granulation step is a step of jetting the melted product obtained in the melting step to granulate the particles.

The granulation unit is a unit configured to jet the melted product obtained in the melting unit to granulate the particles.

The unit configured to jet the melted product to granulate the particles is not particularly limited. Examples thereof include a unit configured to jet the melted product with a second compressive fluid being supplied to the melted product, to granulate the particles.

—Second Compressive Fluid—

The second compressive fluid is not particularly limited and may be appropriately selected depending on the intended purpose. Those that are similar to the above-described first compressive fluid can be used. Substances having a maximum inversion temperature of 800 K or less such as oxygen and nitrogen are preferable, a compressive fluid including nitrogen is more preferable.

Here, the including nitrogen means inclusion of nitrogen molecules, and examples thereof include air.

The nitrogen has a maximum inversion temperature of 620 K and has a lower maximum inversion temperature than a maximum inversion temperature of carbon dioxide (maximum inversion temperature: 1500 K). Therefore, when the pressure of nitrogen is decreased, a decrease in the temperature based on the Joule-Thomson effect is smaller compared to the case where the pressure of a substance (e.g., carbon dioxide) is decreased. Meanwhile, when a substance having a high maximum inversion temperature such as carbon dioxide is used for the second compressive fluid, excess cooling due to the Joule-Thomson effect is caused when the melted product is jetted. As a result, the melted product may be possibly solidified before formed into the particles in some cases, causing inclusion of the fibrous products or cohered products. Moreover, excess cooling causes the melted product to be solidified inside of the nozzles for jetting the melted product, which cannot produce particles having a small diameter and falling a narrow particle size distribution for a long-term in some cases. Therefore, use of nitrogen as the second compressive fluid hardly solidifies the melted product to hardly cause nozzle clogging. As a result, it is possible to continuously granulate the particles.

The second compressive fluid may be used together with the entrainer (co-solvent). As the entrainer, one similar to the entrainer used in the first compressive fluid can be used.

<Other Steps and Other Units>

The other steps are not particularly limited and may be appropriately selected depending on the intended purpose. Examples thereof include a particles-collecting step and a control step.

The other units are not particularly limited and may be appropriately selected depending on the intended purpose. Examples thereof include a particles-collecting unit and a control unit.

An apparatus for producing particles used in the method of the present disclosure for producing particles will be described with reference to figures. In each figure, the same reference numerals are given to the same constituent parts, and duplicate explanation may be omitted.

FIG. 4 is a diagram presenting one example of a continuous apparatus for producing particles used in the method of the present disclosure for producing particles.

An apparatus for producing particles 1 includes a depolymerizing unit 10, a melting unit 20, and a granulation unit 30.

The depolymerizing unit 10 includes: a first supply part 101 including a tank 111 configured to store a resin as a raw material and a metering feeder 112 configured to control a supply amount of the resin; and a second supply part 102 including a tank 121 configured to store a depolymerizing agent that facilitates depolymerization and a metering feeder 122 configured to control a supply amount of the depolymerizing agent. Furthermore, the depolymerizing unit 10 includes an extruder 103 including: a contact part 131 configured to contact the raw materials supplied from the first supply part 101 and the second supply part 102; a reaction part 132 configured to depolymerize the resin; and a discharge part 133 configured to feed the depolymerized product into the melting unit 20. Each unit described above is connected by a pipe (line part in the figure). The arrow in the figure indicates the direction of transporting the material at the starting point side of the arrow in the figure to the end point side.

The melting unit 20 includes a bomb 201 configured to store the first compressive fluid and a pump 202 configured to supply the first compressive fluid to the depolymerized product at a junction A 203. The melting unit 20 can be provided with a unit similar to an extruding unit 103 provided in the depolymerizing unit 10 or a mixing unit such as a known T-shaped joint, a Swirl mixer positively utilizing the Swirl flow, a central collision type mixer configured to allow two liquids to contact in the melting unit 20, a static mixer, or a static mixer of multiply splitting flow path.

The granulation unit 30 includes a bomb 301 configured to store the second compressive fluid and a pump 302 configured to supply the second compressive fluid to a jetting part 303.

The granulation unit 30 is a unit configured to jet the melted product obtained in the melting unit 20 at the jetting part 303 to produce particles.

In the granulation unit, the second compressive fluid is preferably allowed to contact with the melted product.

The second compressive fluid is stored in the bomb 301 and is supplied by the pump 302.

By supplying the second compressive fluid to the melted product, a concentration of a solid content in the melted product is decreased, which makes it possible to lower a viscosity of the melted product. When the melted product has a low viscosity, a temperature of the melted product to be jetted is stable. In addition, a jetting velocity thereof is high and a shearing force of the melted product is large, which hardly causes nozzle clogging.

FIG. 5 is a diagram presenting another example of a continuous apparatus for producing particles used in the method of the present disclosure for producing particles. As presented in FIG. 5, the apparatus for producing particles 1 has a configuration where a bomb 401 and a pump 402, which are configured to supply the first compressive fluid to the reaction part 132 of the apparatus for producing particles 1 presented in FIG. 4, are provided. Such a configuration makes it possible to facilitate depolymerization reaction in the depolymerization step to improve generation efficiency of the depolymerized product.

FIG. 6 is a diagram presenting another example of a continuous apparatus for producing particles used in the method of the present disclosure for producing particles. As presented in FIG. 6, the apparatus for producing particles 1 has a configuration where the apparatus for producing particles 1 presented in FIG. 4 is further provided with a circulation unit 104. The circulation unit 104 has a pipe configured to return a mixture of the resin and the depolymerizing agent from a return port 141 of the reaction part 132 to an inlet port 142 disposed upstream of the return port 141. Note that, the circulation unit 104 is provided with a pump configured to circulate the mixture.

Provision of the circulation unit 104 makes it possible to control a flow rate of the depolymerized product that has flowed near the discharge part 133. In addition, provision of the circulation unit 104 can increase retention time in the reaction part 132, which makes it possible to decrease an amount of an unreacted resin.

FIG. 7 is a diagram presenting another example of a continuous apparatus for producing particles used in the method of the present disclosure for producing particles. As presented in FIG. 7, the apparatus for producing particles 1 is provided with the bomb 401 and the pump 402 configured to supply the first compressive fluid to the depolymerizing unit 10 and the circulation unit 104 as presented in FIGS. 5 and 6.

Such a configuration presented in FIG. 7 can improve efficiency of the depolymerization reaction.

FIG. 8 is a diagram presenting another example of a batch-type apparatus for producing particles 1 used in the method of the present disclosure for producing particles. As presented in FIG. 8, the apparatus for producing particles 1 is an apparatus obtained by replacing the depolymerizing unit 10 of the apparatus for producing particles 1 presented in FIG. 4 with a batch-type stirrer 501, a reaction container 502, and a pump 503.

FIGS. 9 to 13 are each a diagram presenting another example of the apparatus for producing particles 1 used in the method of the present disclosure for producing particles. That is, FIGS. 9 to 13 present configurations where the apparatuses of the present disclosure for producing particles presented in FIGS. 4 to 8 are provided with a collection unit 60.

FIG. 14 is a diagram presenting one example of a configuration that can be used as the collection unit 60. As presented in FIG. 14, in the collection unit 60, the particles jetted from the jetting part 303 provided in the granulation unit 30 are collected through a separator 601. Here, the jetting part 303 includes a compressor 304, a spray tower 305, and a nozzle 311. The separator 601 is not particularly limited and may be appropriately selected depending on the intended purpose. Examples thereof include a cyclone separator. The air pushed out from the compressor 304 is discharged from a blower 602.

By using the method of the present disclosure for producing particles, particles are obtained by depolymerizing the resin; i.e., a polymer. As a result, it is possible to produce particles having an appropriate molecular weight enough for achieving biodegradability. Moreover, it is possible to produce particles including a small amount of a residual monomer. When an amount of the residual monomer included in the produced particles is small, decomposition reaction of the particles can be prevented, which makes it possible to provide products including the particles excellent in safety and stability.

As the amount of the residual monomer is smaller, the particles obtained are more excellent in safety and stability. The amount of the residual monomer is preferably, for example, 1,000 ppm or less.

(Particles)

Particles of the present disclosure are particles including substantially no organic solvent and having considerably small amount of the residual monomer. Since the particles include substantially no organic solvent and have considerably small amount of the residual monomer, the particles obtained are excellent in safety and stability. Here, the "including substantially no organic solvent" means that an amount of the organic solvent in the particles, which is measured through the following measurement method, is equal to or lower than the detection limit.

—Method for Measuring Amount of Residual Solvent—

To particles (1 part by mass) as a target to be measured, 2-propanol (2 parts by mass) is added, and is dispersed through ultrasonic wave for 30 minutes. Then, the resultant is stored for one day or more in a refrigerator (5° C.) to extract the solvent in the particles. The supernatant liquid is analyzed through gas chromatography (GC-14A, available from SHIMADZU CORPORATION) and the amount of the residual solvent can be determined by measuring the solvent and the residual monomer in the particles. Apparatuses used in the method for measuring amount of residual solvent and its conditions are as follows.

Apparatus: GC-14A (available from SHIMADZU CORPORATION)
Column: CBP20-M50-0.25 (available from SHIMADZU CORPORATION)
Detector: FID
Injection amount: 1 to 5 microliters
Carrier gas: He 2.5 kg/cm$^2$
Flow rate of hydrogen: 0.6
Flow rate of air: 0.5
Chart speed: 5 mm/min
Sensitivity: Range 101×Atten20
Column temperature: 40° C.
Injection Temp: 150° C.

A material of the particles is not particularly limited and may be appropriately selected depending on the intended purpose. Examples thereof include resins having a carbonyl structure and biodegradable polyester resins. Examples of the biodegradable polyester resins include polylactic acid resins and polybutylene succinate resins.

A shape, size, and the like of the particles of the present disclosure are not particularly limited. The particles of the present disclosure preferably have the below-described number average molecular weight (Mn), molecular weight distribution (Mw/Mn), average circularity, volume average particle diameter (Dv), and particle size distribution (volume average particle diameter (Dv)/number average particle diameter (Dn)).

The number average molecular weight (Mn) thereof is preferably 1,000 or more but 31,000 or less, more preferably 3,000 or more but 25,000 or less. When the number average molecular weight (Mn) thereof is more than 31,000, nozzle clogging may occur in the granulation step. When the number average molecular weight (Mn) thereof is less than 1,000, storage stability of the particles becomes poor.

The molecular weight distribution (Mw/Mn) thereof is 1.2 or more but 2.5 or less.

The average circularity thereof is preferably 0.8 or more but 1.0 or less, more preferably 0.9 or more but 1.0 or less. When the average circularity thereof is less than 0.8, texture such as the slipping property may become worse.

The average circularity thereof can be calculated by observing arbitrary 50 particles with a scanning electron microscope (SEM) and can be determined as an average value of the circularities of all the particles observed.

In addition to the above method, the average circularity can be measured with a flow particle image analyzer such as a flow particle image analyzer FPIA-2000 available from TOA Medical Electronics Co., Ltd. In this case, the following water is prepared. Specifically, fine dusts are removed by passing the particles through a filter. Next, the number of the thus-obtained particles falling within a measurement range (for example, the equivalent circle diameter: 0.60 micrometers or more but less than 159.21 micrometers) is adjusted to 20 or less in water ($10^{-3}$ cm$^3$). After that, several droplets of a nonionic surfactant (preferably, Contaminon N available from Wako Pure Chemical Industries, Ltd.) are added to the water (10 ml) and a measurement sample (5 mg) is added thereto. The resultant is subjected to a dispersion treatment for 1 minute with an ultrasonic disperser (available from SMT, UH-50) under the following conditions of 20 kHz and 50 W/10 cm$^3$. Moreover, the dispersion treatment is performed for 5 minutes in total. Such a sample dispersing liquid that a concentration of the particles of the measurement sample obtained through the dispersion treatment is 4,000 number/$10^{-3}$ cm$^3$ or more but 8,000 number/$10^{-3}$ cm$^3$ or less (the particles falling within measurable equivalent circle diameters are a target) is used to measure a particle size distribution of the particles having an equivalent circle diameter of 0.60 micrometers or more but less than 159.21 micrometers.

The average circularity is measured by allowing the sample dispersing liquid to pass through a flow pass of a flat transparent flow cell (thickness is about 200 micrometers) that expands along the flow direction. In order to form optical path passing orthogonally to a thickness of the flow cell, a stroboscope and a CCD camera are mounted so that the stroboscope and the CCD camera face each other with the flow cell being disposed therebetween. While the sample dispersing liquid flows, stroboscopic light is emitted at 1/30-second intervals in order to obtain images of particles flowing through the flow cell. As a result, the particles, which have a parallel and consistent range in the flow cell (existing in the form of a plane), are each photographed as a two-dimensional image. From an area of each particle in the two-dimensional image obtained, a diameter of a circle having the same area can be calculated as an equivalent circle diameter.

As a result, equivalent circle diameters of 1,200 or more particles are measured for about 1 minute and a rate (number %) of the particles having the number based on the equivalent circle diameter distribution and the defined equivalent circle diameter is calculated. Results (frequency % and accumulation %) can be obtained by separating a range of 0.06 micrometers or more but 400 micrometers or less into 226 channels (separation into 30 channels with respect to 1 octave). In the actual measurement, the particles are measured in such a range that the equivalent circle diameter is 0.60 micrometers or more but less than 159.21 micrometers.

The volume average particle diameter Dv is preferably 1 micrometer or more but 1,000 micrometers or less, but a range of an appropriate particle diameter is different based on applications. When the particles are used for cosmetics, the volume average particle diameter Dv is preferably 1 micrometer or more but 500 micrometers or less, more preferably 3 micrometers or more but 100 micrometers or less, still more preferably 3 micrometers or more but 50 micrometers or less. When the particles are used for exfoliators such as face washes and toothpastes, the volume average particle diameter Dv is preferably 1 micrometer or more but 500 micrometers or less, more preferably 3 micrometers or more but 100 micrometers or less.

The particle size distribution is a value obtained by dividing the volume average particle diameter (Dv) by the number average particle diameter (Dn). The particle size distribution is preferably 2.5 or less, more preferably 2.0 or less, still more preferably 1.5 or less. When the particle size distribution is more than 2.5, the fluidity may be deteriorated. Note that, the lower limit of the particle size distribution is theoretically 1.

The volume average particle diameter Dv and the number average particle diameter Dn of the particles can be measured using an exact particle size distribution measuring device (available from Beckman Coulter, Inc. "Multisizer 3").

The particles of the present disclosure have a number average molecular weight of 1,000 or more but 31,000 or less and an amount of the residual monomer of 1,000 ppm or less. The particles of the present disclosure include a polylactic acid or polybutylene succinate resin.

—Application—

The particles of the present disclosure are excellent in safety and stability, and thus are widely applied to applications for, for example, daily necessaries, medicines, cosmetics, and electrophotographic toners.

Examples of the applications of the particles of the present disclosure include: additives for skin care products such as face washes, sunscreen agents, cleansing agents, skin lotions, milky lotions, beauty lotions, creams, cold creams, after shaving lotions, shaving soaps, oil absorbing facial paper, and matifiant agents; cosmetics and modifiers for the cosmetics such as foundations, white make-up powders, water white make-up powders, mascara, face powders, grease paints, eyebrow pencils, mascara, eyeliners, eyeshadows, eye shadow bases, nose shadows, lip sticks, lip gloss, rouges, tooth-blackening dyes, nail polishes, and top coats; additives for hair care products such as shampoos, dry shampoos, conditioners, rinses, rinses in shampoos, treatments, hair tonics, hair preparations, hair oils, pomades, and hair coloring agents; additives for amenity products such as perfumes, cologne, deodorants, baby powders, toothpastes, mouth wash solutions, lip creams, and soap; rheology modifiers such as additives for toners and paints; mechanical characteristic improving agents for molded products such as medical diagnostic inspecting agents, automobile materials, and construction materials; mechanical characteristic improving materials such as films and fibers; raw materials for resin molded bodies such as rapid prototyping and rapid manufacturing; various modifiers such as flash molding materials, paste resins for plastic sols, powder blocking materials, fluidity improving materials of powders, lubricants, rubber compounding agents, abrasives, thickeners, filter agents and filter aids, gelling agents, flocculants, additives for paints, oil absorbing agents, releasing agents, fillers for adhesives, slippage improving agents of plastic films • sheets, antiblocking agents, gloss control agents, matting-finishing agents, light diffusing agents, surface hardness improving agents, and toughness improving agents; spacers for liquid crystal display devices; fillers for chromatography; base materials • additives for cosmetic foundations; auxiliary agents for microcapsules; medical materials such as drug delivery systems • diagnostic agents, retention agents of perfumes • agricultural chemicals, catalysts for chemical reaction and their catalytic supports; gas adsorbents; sintered materials for ceramic processing; standard particles for measurement • analysis; particles for the food industry field; materials for powder coating; and toners for electrophotographic development.

(Composition)

A composition of the present disclosure includes at least one of particles produced through the method of the present disclosure for producing particles and the particles of the present disclosure, and further includes other components appropriately selected depending on the intended purpose.

The composition is not particularly limited and may be appropriately selected depending on the intended purpose. Examples thereof include compositions that can be used for the above-described applications.

(Method for Producing Particles Dispersion Liquid and Apparatus for Producing Particles Dispersion Liquid)

A method of the present disclosure for producing a particles dispersion liquid includes depolymerizing a resin to obtain a depolymerized product; contacting the depolymerized product obtained in the depolymerizing with a first compressive fluid to obtain a melted product; and jetting the melted product obtained in the contacting into a liquid solvent to granulate particles, and further includes other steps if necessary.

An apparatus of the present disclosure for producing a particles dispersion liquid includes a depolymerizing unit configured to depolymerize a resin to obtain a depolymerized product; a melting unit configured to contact the depolymerized product obtained in the depolymerizing unit with a first compressive fluid to obtain a melted product; and a granulation unit configured to jet, into a liquid solvent, the melted product obtained in the melting unit to granulate particles, and further includes other units if necessary.

The method for producing a particles dispersion liquid can be suitably performed by the apparatus for producing a particles dispersion liquid.

The method of the present disclosure for producing a particles dispersion liquid can produce a particles dispersion liquid having conditions adapted to application aspects of users because the melted product is jetted into a liquid solvent to granulate particles in the granulation step.

<Depolymerization Step and Depolymerization Unit>

The depolymerization step is the same as the depolymerization step in the method of the present disclosure for producing particles. Therefore, its description is omitted.

The depolymerization unit is the same as the depolymerization unit in the apparatus of the present disclosure for producing particles. Therefore, its description is omitted.

<Melting Step and Melting Unit>

The melting step is the same as the melting step in the method of the present disclosure for producing particles. Therefore, its description is omitted.

The melting unit is the same as the melting unit in the apparatus of the present disclosure for producing particles. Therefore, its description is omitted.

<Granulation Step and Granulation Unit>

The granulation step is a step of jetting the melted product obtained in the melting step into a liquid solvent to granulate particles.

The granulation unit is a unit configured to jet, into a liquid solvent, the melted product obtained in the melting unit to granulate particles.

The granulation step and the granulation unit in the method of the present disclosure for producing a particles dispersion liquid and the apparatus of the present disclosure for producing a particles dispersion liquid are the same as the granulation step and the granulation unit in the method of the present disclosure for producing particles and the apparatus of the present disclosure for producing particles, except that the melted product is jetted into a liquid solvent. Therefore, the description is omitted except for the description in which the melted product is jetted into the liquid solvent.

—Liquid Solvent—

The liquid solvent is not particularly limited and may be appropriately selected depending on the intended purpose. Examples thereof include water, organic solvents, and oils. These may be used alone or in combination.

The organic solvents are not particularly limited and may be appropriately selected depending on the intended purpose. Examples thereof include ethanol.

The oils are not particularly limited and may be appropriately selected depending on the intended purpose. Examples thereof include: natural oils such as macadamia nut oil, avocado oil, corn oil, olive oil, rapeseed oil, sesame oil, castor oil, safflower oil, cottonseed oil, jojoba oil, coconut oil, palm oil, teaseed oil, evening primrose oil, rose hip oil, and liquid lanolin; hydrocarbons such as squalane and pristine; and silicone oils. These may be used alone in combination.

The liquid solvent may further include a dispersant. By including the dispersant in the liquid solvent, it is possible to narrow particle distribution of the particles to improve dispersibility of the particles in the liquid solvent.

The dispersant is not particularly limited and may be appropriately selected depending on the intended purpose. Examples thereof include surfactants, poorly water-soluble inorganic compound dispersants, and polymer-type protective colloids. These may be used alone or in combination. Among them, a surfactant is preferable.

Examples of the surfactants include anionic surfactants, cationic surfactants, nonionic surfactants, and amphoteric surfactants.

Examples of the anionic surfactants include alkylbenzene sulfonate, α-olefin sulfonate, and phosphate. Those having a fluoroalkyl group are preferable. Examples of the anionic surfactants having the fluoroalkyl group include fluoroalkylcarboxylic acid having 2 or more but 10 or less carbon atoms or metal salts thereof, disodium perfluorooctanesulfonylglutamate, sodium 3-[omega-fluoroalkyl (having 6 or more but 11 or less carbon atoms) oxy]-1-alkyl (C3-4) sulphonate, sodium 3-omega-fluoroalkanoyl (C6-8)-N-ethylamino]-1-propanesulfonate, fluoroalkyl (C11-20) carboxylic acid or metal salts thereof, perfluoroalkylcarboxylic acid (C7-13) or metal salts thereof, perfluoroalkyl (C4-12) sulphonic acid or metal salts thereof, perfluorooctanesulfonic acid diethanolamide, N-propyl-N-(2-hydroxyethyl)perfluorooctane sulfonylamide, perfluoroalkyl (C6-10) sulfonamide propyl trimethyl ammonium salts, perfluoroalkyl (C6-10)-N-ethylsulfonylglycine salts, and monoperfluoroalkyl (C6-16) ethyl phosphate esters. Commercially available products of the surfactants having the fluoroalkyl group are, for example, Surflon S-111, S-112, and S-113 (available from Asahi Glass Co., Ltd.); Fluorad FC-93, FC-95, FC-98, and FC-129 (available from Sumitomo 3M Limited); UNIDYNE DS-101 and DS-102 (available from DAIKIN INDUSTRIES, LTD); MEGAFACE F-110, F-120, F-113, F-191, F-812, and F-833 (available from DIC Corporation); Eftop EF-102, 103, 104, 105, 112, 123A, 123B, 306A, 501, 201, and 204 (available from Tohkem Products); and Ftergent F-100 and F150 (available from NEOS COMPANY LIMITED).

Examples of the cationic surfactants include amine-salt-type surfactants and quaternary-ammonium-salt-type cationic surfactants. Examples of the amine-salt-type surfactants include alkylamine salts, amino alcohol fatty acid derivatives, polyamine fatty acid derivatives, and imidazoline. Examples of the quaternary-ammonium-salt-type cationic surfactants include alkyltrimethylammonium salts, dialkyldimethylammonium salts, alkyldimethylbenzylammonium salts, pyridinium salts, alkylisoquinolinium salts, and benzethonium chloride. More specific examples of the cationic surfactants include aliphatic primary, secondary or tertiary amine acids having a fluoroalkyl group, aliphatic quaternary ammonium salts such as perfluoroalkyl (C6-10) sulfonamidopropyl trimethyl ammonium salts, benzalkonium salts, benzethonium chloride, pyridinium salts, and imidazolinium salts. Commercially available products of the cationic surfactants are, for example, Surflon S-121 (available from Asahi Glass Co., Ltd.); Fluorad FC-135 (available from Sumitomo 3M Limited); UNIDYNE DS-202 (available from DAIKIN INDUSTRIES, LTD), MEGAFACE F150 and F-824 (available from DIC Corporation); Eftop EF-132 (available from Tohkem Products); and Ftergent F-300 (available from NEOS COMPANY LIMITED).

Examples of the nonionic surfactants include fatty acid amide derivatives and polyhydric alcohol derivatives.

Examples of the amphoteric surfactants include alanine, dodecyldi(aminoethyl) glycine, di(octylaminoethyl) glycine, and N-alkyl-N, N-dimethylammonium betaine.

Examples of the poorly water-soluble inorganic compound dispersants include tricalcium phosphate, calcium carbonate, titanium oxide, colloidal silica, and hydroxyapatite.

Examples of the polymer-type protective colloids include acids, hydroxyl-group-containing (meth)acrylic monomers, vinyl alcohols or ethers with vinyl alcohol, esters of vinyl alcohol and a carboxyl-group-containing compound, amide compounds or methylol compounds thereof, chlorides, homopolymers or copolymers such as those having a nitrogen atom or a heterocyclic ring thereof, polyoxyethylenes, and celluloses.

Examples of the acids include acrylic acid, methacrylic acid, α-cyanoacrylic acid, α-cyanomethacrylic acid, itaconic acid, crotonic acid, fumaric acid, maleic acid, and maleic anhydride.

Examples of the hydroxyl-group-containing (meth) acrylic monomers include β-hydroxyethyl acrylate, β-hydroxyethyl methacrylate, β-hydroxypropyl acrylate, β-hydroxypropyl methacrylate, γ-hydroxypropyl acrylate, γ-hydroxypropyl methacrylate, 3-chloro-2-hydroxypropyl acrylate, 3-chloro-2-hydroxypropyl methacrylate, diethylene glycol monoacrylate, diethylene glycol monomethacrylate, glycerin monoacrylate, glycerin monomethacrylate, N-methylol acrylamide, and N-methylol methacrylamide.

Examples of the vinyl alcohols or ethers with vinyl alcohol include vinyl methyl ether, vinyl ethyl ether, and vinyl propyl ether.

Examples of the esters of vinyl alcohol and a carboxyl-group-containing compound include vinyl acetate, vinyl propionate, and vinyl butyrate.

Examples of the amide compounds or methylol compounds thereof include acrylamide, methacrylamide, diacetone acrylamide acid, and methylol compounds thereof.

Examples of the chlorides include acrylic acid chloride and methacrylic acid chloride.

Examples of the homopolymers or copolymers such as those having a nitrogen atom or a heterocyclic ring thereof include vinyl pyridine, vinyl pyrrolidone, vinyl imidazole, and ethylene imine.

Examples of the polyoxyethylenes include polyoxyethylene, polyoxypropylene, polyoxyethylene alkylamine, polyoxypropylene alkylamine, polyoxyethylene alkylamide, polyoxypropylene alkylamide, polyoxyethylene nonylphenyl ether, polyoxyethylene lauryl phenyl ether, polyoxyethylene stearyl phenyl ester, and polyoxyethylene nonyl phenyl ester.

Examples of the celluloses include methyl cellulose, hydroxyethyl cellulose, and hydroxypropyl cellulose.

The apparatus for producing a particles dispersion liquid used in the method of the present disclosure for producing a particles dispersion liquid will be described with reference to the figures. In each figure, the same reference numerals are given to the same constituent parts, and duplicate explanation may be omitted.

FIGS. 15 to 19 each present a diagram presenting one example of an apparatus of the present disclosure for producing a particles dispersion liquid. FIG. 20 is a diagram presenting one example of a jetting part of an apparatus of the present disclosure for producing a particles dispersion liquid. The apparatuses for producing a particles dispersion liquid presented in FIGS. 15 to 19 are the same as the apparatuses of the present disclosure for producing particles presented in FIGS. 4 to 8 except that the jetting part 303 of the granulation unit 30 in the apparatuses of the present disclosure for producing particles presented in FIGS. 4 to 8 is changed to a jetting part 304 presented in FIG. 20.

The jetting part 304 provided in the granulation unit 30 in FIG. 20 includes a dispersion liquid producing part 306, a liquid solvent 312, and a nozzle 311. A discharge port of the nozzle 311 is immersed in the liquid solvent 312. As presented in FIG. 20, the granulation unit 30 jets the melted product into the liquid solvent 312 from the nozzle 311 to granulate particles.

(Particles Dispersion Liquid)

A particles dispersion liquid of the present disclosure includes at least one of particles obtained through the method of the present disclosure for producing particles, the particles of the present disclosure, and particles obtained through the method of the present disclosure for producing particles dispersion liquid.

The particles dispersion liquid of the present disclosure includes a liquid solvent.

The liquid solvent is not particularly limited and may be appropriately selected depending on the intended purpose. Examples thereof include the same ones as the liquid solvent used in the granulation step of the method of the present disclosure for producing a particles dispersion liquid.

Particle diameters (e.g., volume average particle diameter (Dv) and number average particle diameter (Dn)), particle size distribution, and concentration of the solid content of the particles in the particles dispersion liquid are not particularly limited and may be appropriately selected depending on the intended purpose.

The particle diameter thereof is preferably 10 nm or more but 1,000 micrometers or less in terms of the volume average particle diameter (Dv).

The concentration of the solid content is preferably 1% by mass or more but 50% by mass or less.

EXAMPLES

The present disclosure will be described more detail by way of Examples. However, the present disclosure should not be construed as being limited to these Examples.

Example 1

Production Example 1 of Resin Particles

In Example 1, the apparatus for producing particles 1 presented in FIG. 4 was used to produce particles. In Example 1, a first compressive fluid was obtained by heating and pressurizing carbon dioxide stored in the bomb 201. In addition, a second compressive fluid was obtained by heating and pressurizing nitrogen stored in the bomb 301.

—Depolymerization Step—

A polylactic resin (weight average molecular weight: Mw=100,000) that is a raw material of particles was charged into the tank 111, and was supplied to the extruding unit 103 at 10 parts by mass/min. The polylactic resin supplied to the extruding unit 103 was heated to 160° C. to be melted. Moreover, 1,4-butanediol (depolymerizing agent) stored in the tank 121 was supplied to the extruding unit 103 at 0.009 parts by mass/min. The polylactic resin, which had been heated to 160° C. to be melted, and 1,4-butanediol were allowed to contact in the contact part 131. The depolymerization reaction of the polylactic resin was performed in the reaction part 132 to obtain a depolymerized product 1. The depolymerized product 1 obtained was introduced into a pipe through the extruding unit 103.

—Melting Step—

Through the pump 202, carbon dioxide as the first compressive fluid in the bomb 201 was introduced so as to maintain 130° C. and 20 MPa into the depolymerized product 1 that had been introduced into the pipe, and was mixed with the depolymerized product 1 at a junction A 203 to obtain a melted product 1. Note that, the first compressive fluid was introduced at 3.5 parts by mass/min.

—Granulation Step—

While nitrogen as the second compressive fluid in the bomb 301 was introduced into the obtained melted product 1 through the pump 302 so as to maintain 130° C. and 20

MPa, the melted product 1 was continuously jetted from the nozzle 311 having a nozzle diameter of 500 micrometers to produce resin particles 1.

Examples 2 to 16

Production Examples 2 to 16 of Resin Particles

Resin particles 2 to 16 were produced in the same manner as in Example 1 except that the resin, the depolymerizing agent, the supply amount of the depolymerizing agent, the supply amount of the first compressive fluid, the pressure in the melting and granulation steps, the second compressive fluid, and the nozzle diameter in Example 1 were changed to those described in Tables 1 to 5.

Example 17

Production Example 17 of Resin Particles

Resin particles 17 are produced in the same manner as in Example 1 except that the particles were produced using the apparatus for producing particles 1 presented in FIG. 5, and the resin, the depolymerizing agent, the supply amount of the depolymerizing agent, the supply amount of the first compressive fluid, the pressure in the melting and granulation steps, the second compressive fluid, and the nozzle diameter in Example 1 were changed to those presented in Table 5.

Example 18

Production Example 18 of Resin Particles

In Example 18, the apparatus for producing particles 1 presented in FIG. 8 was used to produce particles. A first compressive fluid and a second compressive fluid used in Example 18 were the same ones used in Example 1.

—Depolymerization Step—

A polylactic resin (weight average molecular weight: Mw=100,000) (1,000 parts by mass) that is a raw material of particles and 1,4-butanediol (depolymerizing agent) (6.3 parts by mass) were charged into the reaction container 502. While heated to 160° C., the resultant was sufficiently stirred with a stirrer to perform the depolymerization reaction of the polylactic resin, obtaining a depolymerized product 18. The depolymerized product 18 obtained was introduced into a pipe through the pump 503.

—Melting Step—

Through the pump 202, carbon dioxide as the first compressive fluid in the bomb 201 was introduced so as to maintain 130° C. and 50 MPa into the depolymerized product 1 that had been introduced into the pipe, and was mixed with the depolymerized product 1 at a junction C 204 to obtain a melted product 18. Note that, the first compressive fluid was introduced at 3.5 parts by mass/min.

—Granulation Step—

While nitrogen as the second compressive fluid in the bomb 301 was introduced into the obtained melted product 18 through the pump 302 so as to maintain 130° C. and 50 MPa, the melted product 18 was continuously jetted from the nozzle 311 having a nozzle diameter of 100 micrometers to produce resin particles 18.

Comparative Example 1

Production Example 19 of Resin Particles

In Comparative Example 1, resin particles 19 were produced in the same manner as in Example 1 except that the depolymerizing agent was not added.

Comparative Example 2

Production Example 20 of Resin Particles

In Comparative Example 2, resin particles 20 were produced in the same manner as in Example 1 except that the supply amount of the depolymerizing agent and the nozzle diameter were changed and the first compressive fluid was not introduced.

Examples 1 to 18 and Comparative Examples 1 and 2 were evaluated and measured for the continuous operation performance, the amount of the residual monomer, the average circularity, the volume average particle diameter (Dv), the number average particle diameter (Dn), the volume average particle diameter (Dv)/number average particle diameter (Dn), the number average molecular weight (Mn), and the molecular weight distribution (Mw/Mn) in the following manners. Results are presented in Tables 1 to 5.

(Continuous Operation Performance)

Each of the apparatuses for producing particles 1 presented in FIGS. 4, 7, and 8 was continuously operated for 8 hours. Then, the production apparatus 1 was dismantled. Whether the gel compound was attached on, for example, a single cylinder part or a screw was visually evaluated. As a result of the visual evaluation, the case where the gel compound was not attached thereto was evaluated as "OK" and the case where the gel compound was attached thereto was evaluated as "NG".

(Measurement of Amount of Residual Monomer)

Amount of Residual Monomer of Polylactic Acid

A nuclear magnetic resonance apparatus JNM-AL300 (available from JEOL Ltd.) was used to perform the nuclear magnetic resonance measurement of the polymer product (polylactic acid) constituting the particles in heavy chloroform. In this case, a ratio of the quartet peak area (4.98 to 5.05 ppm) derived from lactide to the quartet peak area (5.10 to 5.20 ppm) derived from polylactic acid was calculated and then was multiplied with 1,000,000 to determine the amount of the residual monomer (ppm).

Amount of Residual Monomer of Polybutylene Succinate

A nuclear magnetic resonance apparatus JNM-AL300 (available from JEOL Ltd.) was used to perform the nuclear magnetic resonance measurement of the polymer product (polybutylene succinate) constituting the particles in heavy chloroform. In this case, a ratio of the triplet peak area (2.40 to 2.45 ppm) derived from succinic acid to the triplet peak area (2.50 to 2.60 ppm) derived from polybutylene succinate was calculated and then was multiplied with 1,000,000 to determine the amount of the residual monomer (ppm).

(Average Circularity)

The average circularity was measured using Flow Particle Image Analyzer (device name: FPIA-2000, available from TOA Medical Electronics). Specifically, in a container, several droplets of a nonionic surfactant (product name: Contaminon N, available from Wako Pure Chemical Industries, Ltd.) were added to water (100 mL) in which impurity solid products had been removed in advance. Then, a measurement sample (5 mg) was added thereto to be dispersed. The dispersion liquid obtained was subjected to a dispersion treatment for one minute under the following conditions of 20 kHz and 50 W/10 cm³ with an ultrasonic disperser (device name: UH-50, available from SMT). Moreover, the dispersion treatment was performed for 5 minutes in total. Such a sample dispersing liquid that a concentration of the particles of the measurement sample obtained through the dispersion treatment was 4,000 number/10⁻³ cm³ to 8,000 number/10⁻³ cm³ (the particles falling within measurable equivalent circle diameters are a target) was used to measure a particle size distribution of the particles having an equivalent circle diameter of 0.60 micrometers or more but less than 159.21 micrometers. From these measurement results, the average circularity was calculated.

(Measurement of Volume Average Particle Diameter (Dv) and Number Average Particle Diameter (Dn))

First, 0.1 mL to 5 mL of a surfactant (polyoxyethylene alkyl ether, product name: DRIWEL) as a dispersant was added to 100 mL to 150 mL of an electrolyte aqueous solution. Here, the electrolyte is a 1% by mass aqueous NaCl solution obtained by using sodium chloride (extra pure) (available from Beckman Coulter, Inc., product name: ISOTON-IIPC). Here, 2 mg to 20 mg of the measurement sample was further added thereto. The electrolyte in which the sample had been suspended was subjected to a dispersion treatment for 1 to 3 minutes with an ultrasonic disperser. An exact particle size distribution measuring device (available from Beckman Coulter, Inc. "Multisizer 3"). was used to measure the volume and the number of the particles, followed by measuring the volume distribution and the number distribution thereof. From the measurement results obtained, the volume average particle diameter (Dv) and the number average particle diameter (Dn) of the particles were calculated.

(Measurement of Number Average Molecular Weight (Mn) and Molecular Weight Distribution (Mw/Mn))

Through the gel permeation chromatography (GPC), the measurement was performed under the following conditions.

Apparatus: GPC-8020 (available from Tosoh Corporation)
Columns: TSK G2000HXL and G4000HXL (available from Tosoh Corporation)
Temperature: 40° C.
Solvent: THF (tetrahydrofuran)
Flow rate: 1.0 mL/min A molecular weight calibration curve prepared from a monodisperse polystyrene standard sample was used to calculate the number average molecular weight Mn and the weight average molecular weight Mw of the polymer based on the molecular weight distribution of the polymer. The molecular weight distribution of the polymer was obtained by charging polymer (1 mL) having a concentration of 0.5% by mass and then measuring it under the above-described conditions. The molecular weight distribution is a value obtained by dividing the Mw by the Mn.

TABLE 1

| | | | Example 1 | Example 2 | Example 3 | Example 4 |
|---|---|---|---|---|---|---|
| Resin (Weight average molecular weight: Mw = 100,000) | | | Polylactic acid | Polylactic acid | Polylactic acid | Polylactic acid |
| Depolymerizing agent | | | 1,4-Butanediol | 1,4-Butanediol | 1,4-Butanediol | 1,4-Butanediol |
| Depolymerization step | Supply amount of resin | (Parts by mass/min) | 10 | 10 | 10 | 10 |
| | Supply amount of depolymerizing agent | (Parts by mass/min) | 0.009 | 0.009 | 0.018 | 0.018 |
| | Temperature in depolymerization step | (° C.) | 160 | 160 | 160 | 160 |
| Melting step | Supply amount of firstt compressive fluid | (Parts by mass/min) | 3.5 | 3.5 | 3.5 | 3.5 |
| Pressure in melting and granulation steps | | (MPa) | 20 | 50 | 30 | 40 |
| Granulation step | Temperature in granulation step | (° C.) | 130 | 130 | 130 | 130 |
| | Kind of second compressive fluid | | Nitrogen | Nitrogen | Nitrogen | Nitrogen |
| | Nozzle diameter | (μm) | 500 | 300 | 400 | 200 |
| Evaluation results | Continuous operation performance | | OK | OK | OK | OK |
| | Average circularity | | 0.88 | 0.82 | 0.91 | 0.92 |
| | Volume average particle diameter (Dv) | (μm) | 179.6 | 28.2 | 58.6 | 20.8 |
| | Number average particle diameter (Dn) | (μm) | 19.6 | 6.9 | 8.5 | 6.8 |
| | (Volume average particle diameter Dv/ Number average particle diameter Dn) | | 9.16 | 4.09 | 6.89 | 3.06 |
| | Number average molecular weight (Mn) | (g/mol) | 27,322 | 29,240 | 16,835 | 19,960 |
| | Molecular weight distribution (Mw/Mn) | | 1.83 | 1.71 | 1.98 | 1.67 |

TABLE 2

| | | | Example 5 | Example 6 | Example 7 | Example 8 |
|---|---|---|---|---|---|---|
| Resin (Weight average molecular weight: Mw = 100,000) | | | Polylactic acid | Polylactic acid | Polylactic acid | Polylactic acid |
| Depolymerizing agent | | | 1,4-Butanediol | 1,4-Butanediol | 1,4-Butanediol | 1,4-Butanediol |
| Depolymerization step | Supply amount of resin | (Parts by mass/min) | 10 | 10 | 10 | 10 |
| | Supply amount of depolymerizing agent | (Parts by mass/min) | 0.018 | 0.036 | 0.063 | 0.063 |

TABLE 2-continued

|  |  |  | Example 5 | Example 6 | Example 7 | Example 8 |
|---|---|---|---|---|---|---|
|  | Temperature in depolymerization step | (° C.) | 160 | 160 | 160 | 160 |
| Melting step | Supply amount of firstt compressive fluid | (Parts by mass/min) | 3.5 | 3.5 | 3.5 | 3.5 |
| Pressure in melting and granulation steps |  | (MPa) | 50 | 20 | 20 | 30 |
| Granulation step | Temperature in granulation step | (° C.) | 130 | 130 | 130 | 130 |
|  | Kind of second compressive fluid |  | Nitrogen | Nitrogen | Nitrogen | Nitrogen |
|  | Nozzle diameter | (μm) | 200 | 400 | 300 | 200 |
| Evaluation results | Continuous operation performance |  | OK | OK | OK | OK |
|  | Average circularity |  | 0.94 | 0.94 | 0.93 | 0.97 |
|  | Volume average particle diameter (Dv) | (μm) | 17.9 | 73.2 | 32.9 | 15.9 |
|  | Number average particle diameter (Dn) | (μm) | 6.3 | 9.6 | 7.3 | 7.9 |
|  | (Volume average particle diameter Dv/ Number average particle diameter Dn) |  | 2.81 | 7.42 | 4.51 | 2.01 |
|  | Number average molecular weight (Mn) | (g/mol) | 17,825 | 11,364 | 6,684 | 7,184 |
|  | Molecular weight distribution (Mw/Mn) |  | 1.87 | 1.76 | 1.87 | 1.74 |

TABLE 3

|  |  |  | Example 9 | Example 10 | Example 11 | Example 12 |
|---|---|---|---|---|---|---|
| Resin (Weight average molecular weight: Mw = 100,000) |  |  | Polylactic acid | Polybutylene succinate | Polylactic acid | Polybutylene succinate |
| Depolymerizing agent |  |  | 1,4-Butanediol | 1,4-Butanediol | Ethylene glycol | Water |
| Depolymerization step | Supply amount of resin | (Parts by mass/min) | 10 | 10 | 10 | 10 |
|  | Supply amount of depolymerizing agent | (Parts by mass/min) | 0.117 | 0.063 | 0.0434 | 0.0072 |
|  | Temperature in depolymerization step | (° C.) | 160 | 160 | 160 | 160 |
| Melting step | Supply amount of first compressive fluid | (Parts by mass/min) | 3.5 | 3.5 | 3.5 | 3.5 |
| Pressure in melting and granulation steps |  | (MPa) | 30 | 20 | 40 | 30 |
| Granulation step | Temperature in granulation step | (° C.) | 130 | 130 | 130 | 130 |
|  | Kind of second compressive fluid |  | Nitrogen | Nitrogen | Nitrogen | Nitrogen |
|  | Nozzle diameter | (μm) | 200 | 200 | 100 | 200 |
| Evaluation results | Continuous operation performance |  | OK | OK | OK | OK |
|  | Average circularity |  | 0.96 | 0.93 | 0.92 | 0.91 |
|  | Volume average particle diameter (Dv) | (μm) | 11.3 | 16.2 | 9.1 | 14.2 |
|  | Number average particle diameter (Dn) | (μm) | 5.9 | 8.2 | 5.4 | 6 |
|  | (Volume average particle diameter Dv/ Number average particle diameter Dn) |  | 1.92 | 1.98 | 1.69 | 2.37 |
|  | Number average molecular weight (Mn) | (g/mol) | 3,014 | 6,720 | 7,440 | 11,050 |
|  | Molecular weight distribution (Mw/Mn) |  | 2.37 | 1.86 | 1.68 | 1.81 |

TABLE 4

|  |  |  | Example 13 | Example 14 | Example 15 | Example 16 |
|---|---|---|---|---|---|---|
| Resin (Weight average molecular weight: Mw = 100,000) |  |  | Polybutylene succinate | Polylactic acid | Polybutylene succinate | Polylactic acid |
| Depolymerizing agent |  |  | Ethanol | Lactic acid | Succinate acid | 1,4-Butanediol |
| Depolymerization step | Supply amount of resin | (Parts by mass/min) | 10 | 10 | 10 | 10 |
|  | Supply amount of depolymerizing agent | (Parts by mass/min) | 0.0092 | 0.063 | 0.115 | 0.063 |
|  | Temperature in depolymerization step | (° C.) | 160 | 160 | 160 | 160 |
| Melting step | Supply amount of firstt compressive fluid | (Parts by mass/min) | 3.5 | 3.5 | 3.5 | 3.5 |

TABLE 4-continued

|  |  |  | Example 13 | Example 14 | Example 15 | Example 16 |
|---|---|---|---|---|---|---|
| Pressure in melting and granulation steps | | (MPa) | 40 | 50 | 40 | 30 |
| Granulation step | Temperature in granulation step | (° C.) | 130 | 130 | 130 | 130 |
| | Kind of second compressive fluid | | Nitrogen | Nitrogen | Nitrogen | Carbon dioxide |
| | Nozzle diameter | (μm) | 100 | 100 | 200 | 200 |
| Evaluation results | Continuous operation performance | | OK | OK | OK | OK |
| | Average circularity | | 0.93 | 0.91 | 0.9 | 0.95 |
| | Volume average particle diameter (Dv) | (μm) | 8.2 | 7.8 | 13.1 | 16.3 |
| | Number average particle diameter (Dn) | (μm) | 3.2 | 5.1 | 6.1 | 6.7 |
| | (Volume average particle diameter Dv/ Number average particle diameter Dn) | | 1.58 | 1.58 | 2.15 | 2.43 |
| | Number average molecular weight (Mn) | (g/mol) | 19,268 | 7,962 | 30,120 | 7,062 |
| | Molecular weight distribution (Mw/Mn) | | 1.73 | 1.87 | 1.66 | 1.77 |

TABLE 5

|  |  |  | Example 17 | Example 18 | Comparative Example 1 | Comparative Example 2 |
|---|---|---|---|---|---|---|
| Resin (Weight average molecular weight: Mw = 100,000) | | | Polylactic acid | Polylactic acid | Polylactic acid | Polylactic acid |
| Depolymerizing agent | | | 1,4-Butanediol | 1,4-Butanediol | None | 1,4-Butanediol |
| Depolymerization step | Supply amount of resin | (Parts by mass/min) | 10 | 1000 | 10 | 10 |
| | Supply amount of depolymerizing agent | (Parts by mass/min) | 0.062 | 6.2 | 0 | 0.027 |
| | Temperature in depolymerization step | (° C.) | 160 | 160 | 160 | 160 |
| Melting step | Supply amount of firstt compressive fluid | (Parts by mass/min) | 3.5 | 3.5 | 3.5 | 0 |
| Pressure in melting and granulation steps | | (MPa) | 30 | 50 | 20 | 20 |
| Granulation step | Temperature in granulation step | (° C.) | 130 | 130 | 130 | 130 |
| | Kind of second compressive fluid | | None | Nitrogen | Nitrogen | Nitrogen |
| | Nozzle diameter | (μm) | 300 | 100 | 400 | 400 |
| Evaluation results | Continuous operation performance | | OK | — | NO | NO |
| | Average circularity | | 0.83 | 0.93 | — | — |
| | Volume average particle diameter (Dv) | (μm) | 32.3 | 7.4 | — | — |
| | Number average particle diameter (Dn) | (μm) | 7.4 | 5.3 | — | — |
| | (Volume average particle diameter Dv/ Number average particle diameter Dn) | | 4.35 | 1.40 | — | — |
| | Number average molecular weight (Mn) | (g/mol) | 6,906 | 9,760 | — | — |
| | Molecular weight distribution (Mw/Mn) | | 1.81 | 1.28 | — | — |

In Table 5, the numbers marked with * indicate that the unit is parts by mass. Note that, "-" in Table 5 indicates that any result was not obtained because particles could not be granulated.

In Examples 1 to 18, the amounts of the residual monomers contained in the obtained resin particles 1 to 18 were each 1,000 ppm or less.

Note that, in Examples 1 to 18 and Comparative Examples 1 and 2, an organic solvent was not used for producing the particles. Therefore, the obtained resin particles 1 to 20 included substantially no organic solvent.

Example 19

Production Example 1 of Resin Particles Dispersion Liquid

A resin particles dispersion liquid 1 was prepared in the same manner as in Example 1 except that the apparatus for producing particles 1 presented in FIG. 4 was changed to the apparatus for producing a particles dispersion liquid, the apparatus being presented in FIG. 15 and using water as the liquid solvent.

Examples 20 to 25

Production Examples 2 to 6 of Resin Particles Dispersion Liquids

Resin particles dispersion liquids 2 to 6 were prepared in the same manner as in Example 19 except that the production conditions of the resin particles dispersion liquid in Example 19 were changed as described in Tables 6 and 7.

Example 26

Production Example 7 of Resin Particles Dispersion Liquid

A resin particles dispersion liquid 7 was prepared in the same manner as in Example 19 except that the production conditions of the resin particles dispersion liquid in Example 19 were changed as described in Tables 6 and 7. Note that, in Example 26, evaluation was performed in the same manner as in Example 19 except that a particle diameter in the dispersion liquid obtained was measured with a flow particle image analyzer (device name: FPIA-2000 available from TOA Medical Electronics Co., Ltd.).

Comparative Example 3

Production Example 8 of Resin Particles Dispersion Liquid

A resin particles dispersion liquid was prepared in the same manner as in Comparative Example 1 except that the apparatus for producing particles 1 presented in FIG. 4 was changed to the apparatus for producing a particles dispersion liquid, the apparatus being presented in FIG. 15 and using water as the liquid solvent. In Comparative Example 3, the resin particles dispersion liquid could not be obtained.

Comparative Example 4

Production Example 9 of Resin Particles Dispersion Liquid

A resin particles dispersion liquid was prepared in the same manner as in Comparative Example 2 except that the apparatus for producing particles 1 presented in FIG. 4 was changed to the apparatus for producing a particles dispersion liquid, the apparatus being presented in FIG. 15 and using water as the liquid solvent. In Comparative Example 4, the resin particles dispersion liquid could not be obtained.

TABLE 6

| | | | Example 19 | Example 20 | Example 21 | Example 22 |
|---|---|---|---|---|---|---|
| Resin (Weight average molecular weight: Mw = 100,000) | | | Polylactic acid | Polylactic acid | Polylactic acid | Polylactic acid |
| Depolymerizing agent | | | 1,4-Butanediol | Ethylene glycol | 1,4-Butanediol | 1,4-Butanediol |
| Depolymerization step | Supply amount of resin | (Parts by mass/min) | 10 | 10 | 10 | 10 |
| | Supply amount of depolymerizing agent | (Parts by mass/min) | 0.009 | 0.006 | 0.018 | 0.018 |
| | Temperature in depolymerization step | (° C.) | 160 | 160 | 160 | 160 |
| Melting step | Supply amount of firstt compressive fluid | (Parts by mass/min) | 3.5 | 3.5 | 3.5 | 3.5 |
| Pressure in melting and granulation steps | | (MPa) | 20 | 50 | 30 | 40 |
| Granulation step | Temperature in granulation step | (° C.) | 130 | 130 | 130 | 130 |
| | Kind of second compressive fluid | | Nitrogen | Carbon dioxide | Nitrogen | Carbon dioxide |
| | Kind of liquid solvent | | Water | Water | Jojoba oil | Squaline |
| | Concentration of solid content (wt %) | | 5.4 | 47.5 | 23.6 | 35.2 |
| | Nozzle diameter | (μm) | 230 | 170 | 100 | 170 |
| Evaluation results | Continuous operation performance | | OK | OK | OK | OK |
| | Average circularity | | 0.92 | 0.89 | 0.98 | 0.92 |
| | Volume average particle diameter (Dv) | (μm) | 17.0 | 7.4 | 12.5 | 8.8 |
| | Number average particle diameter (Dn) | (μm) | 4.1 | 2.3 | 6.7 | 3.7 |
| | (Volume average particle diameter Dv/ Number average particle diameter Dn) | | 4.29 | 3.22 | 1.87 | 2.38 |
| | Number average molecular weight (Mn) | (g/mol) | 18,738 | 20,231 | 12,068 | 10,982 |
| | Molecular weight distribution (Mw/Mn) | | 1.91 | 1.85 | 1.96 | 1.94 |

TABLE 7

| | | | Example 23 | Example 24 | Example 25 | Example 26 |
|---|---|---|---|---|---|---|
| Resin (Weight average molecular weight: Mw = 100,000) | | | Polybutylene succinate | Polybutylene succinate | Polybutylene succinate | Polybutylene succinate |
| Depolymerization agent | | | Ethylene glycol | 1,4-Butanediol | 1,4-Butanediol | 1,4-Butanediol |
| Depolymerization step | Supply amount of resin | (Parts by mass/min) | 10 | 10 | 10 | 10 |
| | Supply amount of depolymerizing agent | (Parts by mass/min) | 0.180 | 0.072 | 0.080 | 0.480 |
| | Temperature in depolymerization step | (° C.) | 160 | 160 | 160 | 160 |
| Melting step | Supply amount of firstt compressive fluid | (Parts by mass/min) | 3.5 | 3.5 | 3.5 | 3.5 |
| Pressure in melting and granulation steps | | (MPa) | 20 | 50 | 30 | 40 |
| Granulation step | Temperature in granulation step | (° C.) | 180 | 180 | 180 | 180 |
| | Kind of second compressive fluid | | Carbon dioxide | Nitrogen | Carbon dioxide | Nitrogen |

TABLE 7-continued

|  |  |  | Example 23 | Example 24 | Example 25 | Example 26 |
|---|---|---|---|---|---|---|
| Evaluation results | Kind of liquid solvent | | Water | Jojoba oil | Squalane | Water |
| | Concentration of solid content (wt %) | | 49.6 | 35.8 | 13.6 | 12.4 |
| | Nozzle diameter | (μm) | 170 | 230 | 170 | 100 |
| | Continuous operation performance | | OK | OK | OK | OK |
| | Average circularity | | 0.92 | 0.91 | 0.92 | 0.85 |
| | Volume average particle diameter (Dv) | (μm) | 15.2 | 9.2 | 9.6 | 0.9(※1) |
| | Number average particle diameter (Dn) | (μm) | 8.4 | 4.7 | 4.1 | — (※1) |
| | (Volume average particle diameter Dv/ Number average particle diameter Dn) | | 1.81 | 1.96 | 3.34 | 2.63 |
| | Number average molecular weight (Mn) | (g/mol) | 4,000 | 0,400 | 3,721 | 3,201 |
| | Molecular weight distribution (Mw/Mn) | | 1.76 | 1.86 | 1.71 | 1.74 |

※1 Calculation results with a flow particle image analyzer (device name: FPIA-2000 available from TOA Medical Electronics Co., Ltd.)

TABLE 8

|  |  |  | Comparative Example 3 | Comparative Example 4 |
|---|---|---|---|---|
| Resin (Weight average molecular weight Mw = 100,000) | | | Polylactic acid | Polylactic acid |
| Depolymerizing agent | | | — | 1,4-Butanediol |
| Depolymerization step | Supply amount of resin | (Parts by mass/min) | 10 | 10 |
| | Supply amount of depolymerizing agent | (Parts by mass/min) | 0 | 0.027 |
| | Temperature in depolymerization step | (° C.) | 100 | 100 |
| Melting step | Supply amount of first compressive fluid | (Parts by mass/min) | 3.6 | 0 |
| Pressure in melting and granulation steps | | (MPa) | 20 | 20 |
| Granulation step | Temperature in granulation step | (° C.) | 130 | 130 |
| | Kind of second compressive fluid | | Nitrogen | Nitrogen |
| | Kind of liquid solvent | | Water | Water |
| | Concentration of solid content (wt %) | | — | — |
| | Nozzle diameter | (μm) | 400 | 400 |
| Evaluation results | Continuous operation performance | | — | — |
| | Average circularity | | — | — |
| | Volume average particle diameter (Dv) | (μm) | — | — |
| | Number average particle diameter (Dn) | (μm) | — | — |
| | (Volume average particle diameter Dv/Number average particle diameter Dn) | | — | — |
| | Number average molecular weight (Mn) | (g/mol) | — | — |
| | Molecular weight distribution (Mw/Mn) | | — | — |

Note that, "—" in Table 8 indicates that any result was not obtained because particles could not be granulated.

In Examples 19 to 26, the amounts of the residual monomers contained in the resins of the obtained resin dispersing liquids 1 to 7 were each 1,000 ppm or less.

Aspects of the present disclosure are as follows, for example.

<1> A method for producing particles, the method including:
depolymerizing a resin to obtain a depolymerized product;
contacting the depolymerized product obtained in the depolymerizing with a first compressive fluid to obtain a melted product; and
jetting the melted product obtained in the contacting to granulate the particles.

<2> The method for producing particles according to <1>, wherein the depolymerizing allows the resin to flow with the resin being depolymerized, in a presence of a depolymerizing agent.

<3> The method for producing particles according to <1> or <2>,
wherein a compressive fluid is supplied in the depolymerizing.

<4> The method for producing particles according to any one of <1> to <3>,
wherein in the jetting, the melted product is jetted with a second compressive fluid being supplied to the melted product.

<5> The method for producing particles according to any one of <1> to <4>,
wherein the resin is a resin containing a carbonyl structure.

<6> The method for producing particles according to <4> or <5>,
wherein the first compressive fluid includes carbon dioxide, and
the second compressive fluid includes nitrogen.

<7> The method for producing particles according to any one of <1> to <6>, wherein the resin is depolymerized by hydrolysis reaction.

<8> An apparatus for producing particles, the apparatus including:
a depolymerizing unit configured to depolymerize a resin to obtain a depolymerized product;
a melting unit configured to contact the depolymerized product obtained in the depolymerizing unit with a first compressive fluid to obtain a melted product; and
a granulation unit configured to jet the melted product obtained in the melting unit to granulate the particles.

<9> The apparatus for producing particles according to <8>,
wherein the depolymerizing unit includes:
a first supply part configured to supply the resin;
a second supply part configured to supply a depolymerizing agent for the resin;
a contact part configured to contact the resin supplied from the first supply part with the depolymerizing agent supplied from the second supply part;
a discharge part configured to discharge the depolymerized product; and
a reaction part, between the contact part and the discharge part, configured to allow the resin to flow from the contact part to the discharge part with the resin being depolymerized, in a presence of the depolymerizing agent supplied from the second supply part.

<10> The apparatus for producing particles according to <9>,
wherein the reaction part further includes a circulation unit, and
wherein the circulation unit includes a pipe configured to return a mixture of the resin and the depolymerizing agent from a return port of the reaction part to an inlet port disposed upstream of the return port.

<11> The apparatus for producing particles according to <9> or <10>,
wherein the reaction part includes an extruding unit.

<12> The apparatus for producing particles according to <8>,
wherein the depolymerizing unit includes a stirrer.

<13> The apparatus for producing particles according to any one of <8> to <12>,
wherein the melting unit includes an extruding unit.

<14> The apparatus for producing particles according to any one of <8> to <13>, further including
a collection unit configured to collect the particles.

<15> Particles,
which are obtained through the method for producing particles according to any one of <1> to <7>, and include substantially no organic solvent.

<16> Particles including
a polylactic acid or polybutylene succinate resin,
wherein a number average molecular weight of the particles is 1,000 or more but 31,000 or less and an amount of a residual monomer in the particles is 1,000 ppm or less.

<17> The particles according to <16>,
wherein a value determined by dividing a weight average molecular weight of the particles by the number average molecular weight of the particles is 1.2 or more but 2.5 or less.

<18> A composition including
the particles according to any one of <15> to <17>.

<19> A method for producing a particles dispersion liquid, the method including:
depolymerizing a resin to obtain a depolymerized product;
contacting the depolymerized product obtained in the depolymerizing with a first compressive fluid to obtain a melted product; and
jetting the melted product obtained in the contacting into a liquid solvent to granulate particles.

<20> The method for producing a particles dispersion liquid according to <19>,
wherein the depolymerizing allows the resin to flow with the resin being depolymerized, in a presence of the depolymerizing agent.

<21> The method for producing a particles dispersion liquid according to <19> or <20>,
wherein, in the depolymerizing, a compressive fluid is supplied.

<22> The method for producing a particles dispersion liquid according to any one of <19> to <21>,
wherein, in the jetting, the melted product is jetted with a second compressive fluid being supplied to the melted product.

<23> The method for producing a particles dispersion liquid according to any one of <19> to <22>,
wherein the resin is a resin containing a carbonyl structure.

<24> The method for producing a particles dispersion liquid according to <22> or <23>,
wherein the first compressive fluid includes carbon dioxide, and
the second compressive fluid includes nitrogen.

<25> The method for producing a particles dispersion liquid any one of <19> to <24>,
wherein the resin is depolymerized by hydrolysis reaction.

<26> An apparatus for producing a particles dispersion liquid, the apparatus including:
a depolymerizing unit configured to depolymerize a resin to obtain a depolymerized product;
a melting unit configured to contact the depolymerized product obtained in the depolymerizing unit with a first compressive fluid to obtain a melted product; and
a granulation unit configured to jet, into a liquid solvent, the melted product obtained in the melting unit to granulate particles.

<27> A particles dispersion liquid including
the particles according to any one of <15> to <17>.

<28> The particles dispersion liquid according to <27>,
wherein the particles dispersion liquid includes a liquid solvent, and the liquid solvent is at least one selected from the group consisting of water and oil.

The method for producing particles according to any one of <1> to <7>, the apparatus for producing particles according to any one of <8> to <14>, the particles according to any one of <15> to <17>, the composition according to <18>, the method for producing a particles dispersion liquid according to any one of <19> to <25>, the apparatus for producing a particles dispersion liquid according to <26>, and the particles dispersion liquid according to <27> or <28> can solve the conventionally existing problems and can achieve the object of the present disclosure.

DESCRIPTION OF THE REFERENCE NUMERAL

1 apparatus for producing particles
10 depolymerizing unit
101 first supply part 102 second supply part
103 extruding unit
131 contact part
132 reaction part
133 discharge part
104 circulation unit
141 return port
142 inlet port
20 melting unit
30 granulation unit
501 stirrer
60 collection unit

The invention claimed is:

1. A method for producing particles, the method comprising:
   depolymerizing a resin to obtain a depolymerized product;
   contacting the depolymerized product obtained in the depolymerizing with a first compressive fluid to obtain a melted product; and
   jetting the melted product obtained in the contacting into a liquid solvent to granulate the particles,
   wherein the resin is a pressure plastic material having a property of lowering a glass transition temperature through application of pressure, and a gradient of a change of the glass transition temperature of the pressure plastic material is −2° C./MPa or less, and
   the liquid solvent includes a dispersant.

2. The method for producing particles according to claim 1, wherein the depolymerizing allows the resin being depolymerized in a presence of a depolymerizing agent to flow.

3. The method for producing particles according to claim 1, wherein a compressive fluid is supplied in the depolymerizing.

4. The method for producing particles according to claim 1, wherein in the jetting, the melted product is jetted with a second compressive fluid being supplied to the melted product.

5. The method for producing particles according to claim 1, wherein the resin is a resin containing a carbonyl structure.

6. The method for producing particles according to claim 4, wherein the first compressive fluid includes carbon dioxide, and the second compressive fluid includes nitrogen.

7. The method for producing particles according to claim 1, wherein the resin is depolymerized by hydrolysis reaction.

8. A method for producing a particles dispersion liquid, the method comprising: using the particles produced according to the method of claim 1.

* * * * *